(12) United States Patent
Bjorklund et al.

(10) Patent No.: US 7,126,926 B1
(45) Date of Patent: Oct. 24, 2006

(54) MULTI-TIER WIRELESS COMMUNICATIONS ARCHITECTURE, APPLICATIONS AND METHODS

(75) Inventors: Ronald Bjorklund, Bahama, NC (US); Raj Bridgelall, Morgan Hill, CA (US); William Derouchey, Scotts Vally, CA (US); Charles Furedy, Marietta, GA (US); Narayan Nambudiri, Bangalore (IN); Richard Watson, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 962 days.

(21) Appl. No.: 09/663,774

(22) Filed: Sep. 18, 2000

Related U.S. Application Data

(63) Continuation-in-part of application No. 09/483,167, filed on Jan. 14, 2000.

(51) Int. Cl.
  H04Q 7/00 (2006.01)
  H04J 1/00 (2006.01)
  H04B 15/00 (2006.01)

(52) U.S. Cl. .................. 370/328; 370/343; 370/401; 370/480; 455/62

(58) Field of Classification Search .............. 340/531, 340/855.8, 870.03, 870.06; 370/310–312, 370/328–329, 334, 338, 339, 352, 389, 401, 370/419, 335, 441; 455/3.03, 404.2, 422.1, 455/456.1, 422
See application file for complete search history.

(56) References Cited

U.S. PATENT DOCUMENTS

| 4,017,825 | A | * | 4/1977 | Pichey ....................... 340/906 |
| 5,029,183 | A | | 7/1991 | Tymes |
| 5,103,461 | A | | 4/1992 | Tymes |
| 5,142,550 | A | | 8/1992 | Tymes |
| 5,157,687 | A | | 10/1992 | Tymes |
| 5,280,498 | A | | 1/1994 | Tymes et al. |
| 5,295,154 | A | | 3/1994 | Meier et al. |
| 5,349,588 | A | * | 9/1994 | Schellinger ................. 714/778 |
| 5,418,812 | A | | 5/1995 | Reyes et al. |
| 5,479,441 | A | | 12/1995 | Tymes et al. |
| 5,528,621 | A | | 6/1996 | Heiman et al. |
| 5,668,803 | A | | 9/1997 | Tymes et al. |
| 5,673,252 | A | | 9/1997 | Johnson et al. |
| 5,696,903 | A | * | 12/1997 | Mahany ...................... 709/228 |
| 5,737,703 | A | * | 4/1998 | Byrne ........................ 455/442 |
| 5,790,536 | A | | 8/1998 | Mahany et al. |
| 5,812,589 | A | | 9/1998 | Sealander et al. |
| 5,815,811 | A | | 9/1998 | Pinard et al. |
| 5,844,893 | A | * | 12/1998 | Gollnick et al. ............ 370/329 |
| 5,928,291 | A | * | 7/1999 | Jenkins et al. ................. 701/1 |
| 6,160,493 | A | * | 12/2000 | Smith ........................ 340/902 |
| 6,275,166 | B1 | | 8/2001 | del Castillo et al. |
| 6,377,608 | B1 | * | 4/2002 | Zyren ........................ 375/132 |

(Continued)

*Primary Examiner*—Chi Pham
*Assistant Examiner*—Tri H. Phan
(74) *Attorney, Agent, or Firm*—Williams, Morgan & Amerson, P.C.

(57) ABSTRACT

Multi-tier system for digital radio communication. The multi-tier system has a first-tier base station with relatively long-range radio and has a second-tier base station with relatively short-range, low power and cheaper radios. The system can be more versatilely configured to meet demands of various applications. The application may include data capture using bar code readers, radio frequency readers and other automatic data capture devices. The system may also be used to control hotel door locks, individual room temperature control, remote video monitoring—all without having to wire and with much flexibility given the two types of radios employed.

30 Claims, 18 Drawing Sheets

U.S. PATENT DOCUMENTS

| | | | |
|---|---|---|---|
| 6,404,775 B1 * | 6/2002 | Leslie et al. | 370/466 |
| 6,437,692 B1 * | 8/2002 | Petite et al. | 340/540 |
| 6,466,981 B1 * | 10/2002 | Levy | 709/227 |
| 6,526,335 B1 * | 2/2003 | Treyz et al. | 701/1 |
| 6,690,657 B1 * | 2/2004 | Lau et al. | 370/315 |
| 6,850,512 B1 * | 2/2005 | Bishop et al. | 370/342 |

* cited by examiner

MULTI-TIER WIRELESS COMMUNICATIONS ARCHITECTURE, APPLICATIONS AND METHODS

REFERENCE TO RELATED APPLICATIONS

This application is a continuation-in-part of U.S. Ser. No. 09/483,167, filed on Jan. 14, 2000.

BACKGROUND OF THE INVENTION

A. Field of the Invention

The present invention relates to multi-tier wireless communications architecture, applications and methods of using wireless units having differing communication functionalities and ranges.

B. Description of the Related Art

Each year more electronic devices are being deployed in a wider variety of commercial areas. In particular, data acquisition devices, such as bar code scanners, hand held terminals and radio frequency identification ("RFID") readers, are being adopted to speed up commercial operations and are a standard fixture in inventory tracking environments, as well as in many consumer businesses. With wide deployment of these electronic devices across manufacturing, inventory, and retail sales areas, there has been an increasingly strong demand for wireless connectivity between the data acquisition units and the corporate local area network ("LAN"). In response, various wireless solution vendors have come up with systems using spread spectrum technologies in the 900 MHz and 2.4 GHz radio bands. Spread spectrum technologies are widely used in these applications because they can co-exist with other radio devices without causing significant interferences and thus do not require FCC licenses. Various examples and details of spread spectrum communication in these radio bands using base stations, access points and portable terminals are disclosed in the following patents assigned to Symbol Technologies, all of which patents are herein incorporated by reference: U.S. Pat. No. 5,815,811; U.S. Pat. No. 5,812,589; U.S. Pat. No. 5,668,803; U.S. Pat. No. 5,528,621; U.S. Pat. No. 5,479,441; U.S. Pat. No. 5,418,812; U.S. Pat. No. 5,280,498; U.S. Pat. No. 5,157,687; U.S. Pat. No. 5,142,550; U.S. Pat. No. 5,103,461; and U.S. Pat. No. 5,029,183.

Although they have relatively long ranges and are versatile, these spread spectrum radio transceivers, however, have been generally expensive. Furthermore, due to the expensive nature of these radios, the applications have been generally limited to the more expensive data capture devices. However, cheaper and shorter-range radio transceivers, when used in conjunction with longer-range radios (collectively forming a "multi-tier radio communications architecture"), would have much broader applications heretofore unapplied, such as handheld terminals, price checkers, temperature and other sensors, hotel, school, and other door locks, and remote video cameras.

There also have been proposed multi-tier communication systems, such as the one disclosed in U.S. Pat. No. 5,790,536, which is herein incorporated by reference. U.S. Pat. No. 5,790,536 shows wireless units with relatively long range participating in the "premises" LAN and other wireless units with shorter range participating in the "peripheral" LAN. In such conventional systems the main communications are done through the "premises" LAN, whereas in the "peripheral" LAN, wireless units are temporally formed (and dissolved) on an ad hoc basis for short communications such as for printing. Furthermore, the conventional systems generally require a coordination between the upper-tier radio communication protocol and the lower-tier radio communication protocol. These factors (i.e., need to accommodate ad hoc communications and protocol coordination between different tier units) generally contribute to a more expensive solution for the lower-tier radio transceiver. Moreover, U.S. Pat. No. 5,790,536 discloses only a few specific applications and does not disclose detailed applications of the multi-tier architecture discussed hereinbelow.

SUMMARY OF THE INVENTION

Therefore, the proposals of the related art fail to comprehensively overcome the problems discussed above and other related problems. Advantages of this invention will be set forth in part in the description which follows, and in part will be obvious from the description, or may be learned by practice of the invention. The advantages of the invention will be realized and attained by means of the elements and combinations particularly pointed out in the appended claims.

In accordance with the purpose of the invention, as embodied and broadly described herein, the invention comprises: a first-tier base station comprising a first radio transceiver operating in accordance with a first communication protocol, the first-tier base station connected to a local area network ("LAN"), a second-tier base station comprising a second radio transceiver operating in accordance with a second communication protocol independent of the first communication protocol and the second-tier base station connected to the first-tier base station, a first-tier remote unit wirelessly connected to the first-tier base station through the first radio transceiver, and a second-tier remote unit wirelessly connected to the second-tier base station through the second radio transceiver.

In another embodiment of the invention, the invention comprises: a host connected to a local area network, a first-tier base station connected to the host through the local area network, the first-tier base station comprising a first radio transceiver for spread spectrum radio transmission in accordance with a first communication protocol, a second-tier base station comprising a second radio transceiver operating in accordance with a second communication protocol independent of the first communication protocol and the second-tier base station connected to the first-tier base station, a remote unit wirelessly connected to the second-tier base station through the second radio transceiver.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DETAILED DESCRIPTION OF THE EMBODIMENTS

Reference will now be made in detail to the embodiments of the invention, examples of which are illustrated in the accompanying drawings.

The overall nature of a Radio Packet Assembler/Disassembler. (RadPad) system is intended to develop cordless devices that are application independent. Targeted for scanner, terminal, printer, cash register and wearable computer products, the RadPad can be easily integrated into system designs and provides industry standard mechanisms for both electrical and protocol interface.

RadPad implementations support RF communication capability across single (point-to-point) or multiple (point-to-multipoint) domains in a in a battery-powered environment facilitated by an integrated power management capability. The serial interface placed no restriction on the host operating system and can operate in any number of environments. Frame retries are managed automatically in the event of transmission errors. Additionally, frequency agility permits a RadPad to operated in a crowded RF environment by selecting an appropriately quiet frequency channel.

Figure 1:
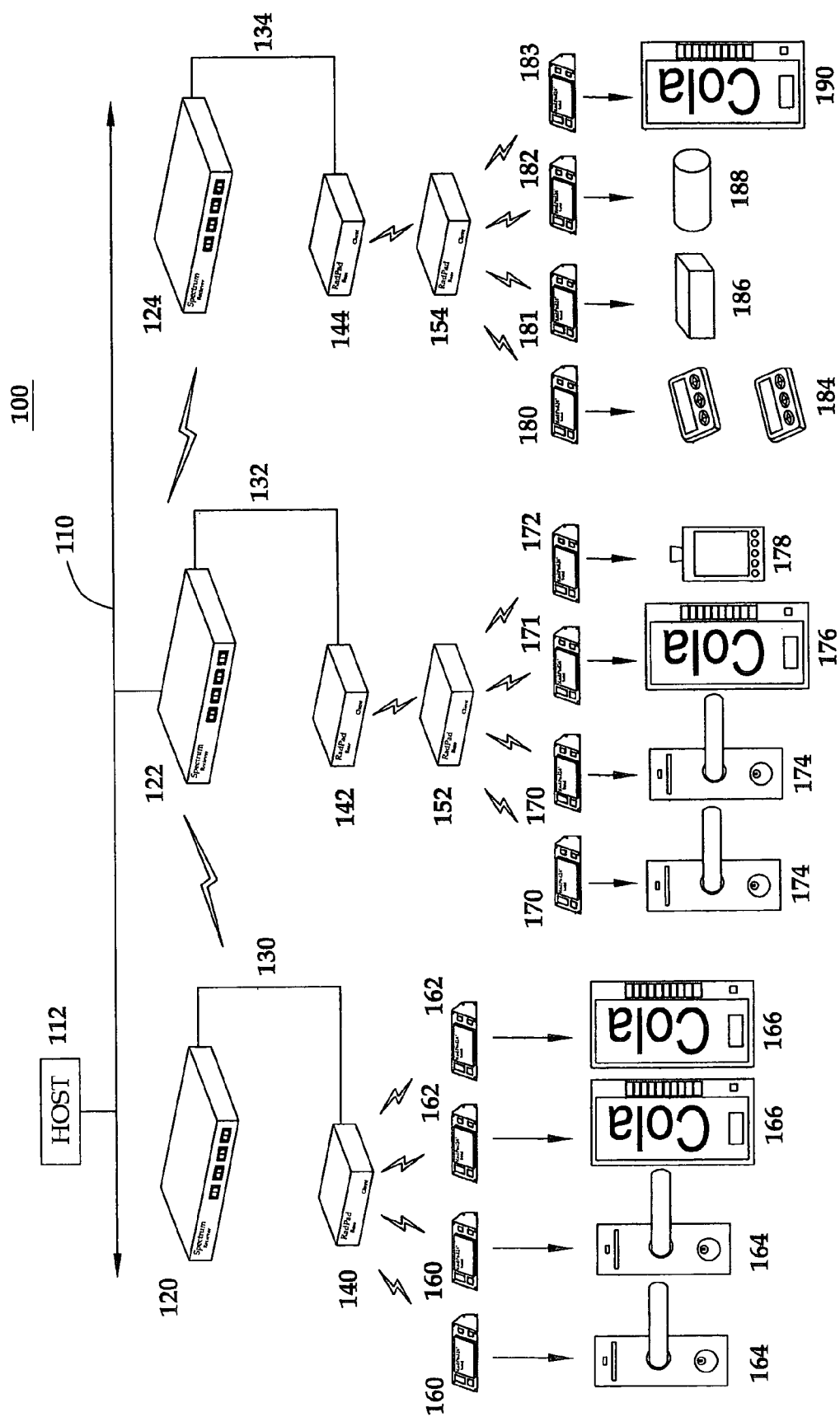
FIG. 1 is a diagram of a multi-tier communication system built in accordance with the principles of the invention.

FIG. 1 illustrates a multi-tier communication system 100 in accordance with the present invention. The system comprises a wired LAN 110, a host computer 112 connected to wired LAN 110, a plurality of first-tier base stations 120, 122, and 124, a plurality of second-tier base stations 140, 142, 144, 152, and 154 and various types of wireless units 164, 166, 174, 176, 178, 184, 186, 188, and 190, with each of wireless units having respective wireless module 160, 162, 170, 171, 172, 180, 181, 182 or 183.

The wired backbone 110 could be any LAN, such as Ethernet, token ring, or token bus. Many of these LANs are now standardized by the IEEE: IEEE 802.3 (Ethernet), IEEE 802.4 (Token Bus), and IEEE 802.5 (Token Ring).

The first-tier base station could be any base station or access point readily available on the market. For example, WCCN Wireless Handbook—RF Terminals & LANs (1997 Third Edition), which is herein incorporated by reference in its entirety, describes at pp. 17–28, base stations used in vendor protocol dependent approach and access points in vendor protocol independent approach (or alternatively referred to as target protocol dependent approach). In this patent application, the term base stations refers to both base stations and access points.

In FIG. 1, base station 122 is connected to the wired LAN via a hard-wired link. Other base stations, such as 120 and 122, may be linked wirelessly to wired LAN 110 through base station 122. Wireless first-tier base stations 120 and 124 may be located away from the wired first-tier base station 122 in the range of a few to several hundred feet.

The second-tier station includes an RF transceiver meeting the following criteria: (1) the communication protocol of the second-tier base station must be independent of the protocol for the first-tier base station; (2) a relatively short range (5–100 feet); and (3) low power. An example of an RF transceiver that could be used a second-tier base station is discussed in FIGS. 9–13 and the corresponding text. Another such radio transceiver could be the Bluetooth radio under development. See Bluetooth Specification, version 0.9, which is herein incorporated by reference in its entirety.

Second-tier base station 142 is linked to first-tier station 122 via a wired link 132 (or 130 or 134). Wired links 130, 132 and 134 could be any wired link. However, a preferred link would be a serial link, such as RS 232. A serial link, such as RS 232, is preferred because it is very cheap and ubiquitously available. Second-tier base station 142 is then wireless connected with another second-tier base station 152. Second-tier base station 152 in turn wirelessly communicates with wireless units 174, 176 and 178. Each of these wireless units 174 (security locks), 176 (vending machine), and 178 (handheld terminal) includes respective wireless module 170, 171 or 172 for wireless communication. The details of wireless transceivers 170, 171 and 172 are discussed below in FIGS. 9–13. Through this multi-tier architecture, any of the wireless units may communicate with any other device on the network, including host 112 and other wireless units.

First-tier base station 120 and the related units attached thereto illustrate another configuration. First-tier base station 120 is wirelessly connected to wired LAN 110 via first-tier base station 122 by relatively long-range radio. First-tier base station 120 is also connected to a second-tier base station 140 by a wired link 130. Second-tier base station 140 wirelessly communicates with wireless units 164 (hotel door locks) and 166 (vending machines), each of which includes a relatively short range wireless module 160 or 162. The configuration under first-tier base station 120 differs from that of first-tier base station 122 in that wireless units 164 and 166 are connected directly to second-base station 140 without another second-tier base station in between.

First-tier base station 120 and the related units attached thereto illustrate another configuration. First-tier base station 120 is wirelessly connected to wired LAN 110 via first-tier base station 122 by relatively long-range radio. First-tier base station 120 is also connected to a second-tier base station 140 by a wired link 130. Second-tier base station 140 wirelessly communicates with wireless units 164 (hotel door locks) and 166 (vending machines), each of which includes a relatively short range wireless module 160 or 162. The configuration under first-tier base station 120 differs from that of first-tier base station 122 in that wireless units 164 and 166 are connected directly to second-base station 140 without another second-tier base station in between.

First-tier base station 124 and the related units attached thereto illustrate yet another configuration. First-tier base station 124 is wirelessly connected to wired LAN 110 via first-tier base station 122 by relatively long-range radio. First-tier base station 124 is also connected to a second-tier base station 144 by a wired link 130. Second-tier base station 144, in turn, is connected to another second-tier base station 154 via one or more intermediate second-tier base stations (as indicated by dots in FIG. 1). In this manner, wireless units 184 (pager), 186 (building controls, serial devices), 188 (RFID, sensors, telemetry) and 190 (vending machine), each of which includes a relatively short range wireless module 180, 181, 182 or 183, may be connected to wired LAN 110 and other wireless units. The configuration under first-tier base station 124 differs from that of first-tier base station 122 in that wireless units 164 and 166 are connected to second-base station 140 with a plurality of second-tier base stations in between.

Note that the specific configurations shown in FIG. 1 are illustrative only and many other configurations are possible. Thus, any of the configurations under first-tier base stations 122, 120 and 124 may be mixed and matched. For example, first-tier base station 122 may be connected to wireless units via a plurality of intermediate second-tier base stations, as with first-tier base station 124 or may be connected to wireless units with only one second-tier base station, as with first-tier base station 120. Conversely, first-tier base station 120 may be set up with the configurations of first-tier base station 122 or 124, and first-tier base station 124 may be set up with the configurations of first-tier base station 120 or 122.

In a further alternative configuration (not shown in FIG. 1), there may be a plurality of wirelessly linked first-tier base stations. For example, there may be one of more wireless first-tier base station between base stations 120 and 122 and between base stations 124 and 122 in FIG. 1. In this manner, the range may be extended by relatively few long range base stations.

It will be understood that the multi-tier architecture provides at least the following benefits: (1) many wireless units (such as 164, 166, 174, 176, 178, 184, 186, 188 and 190) may be served by relatively inexpensive and relatively short range wireless modules; and (2) at the same time, the range is extended by placing relatively few long-range base stations in strategic locations, optimizing the range and the cost considerations.

Figure 2:
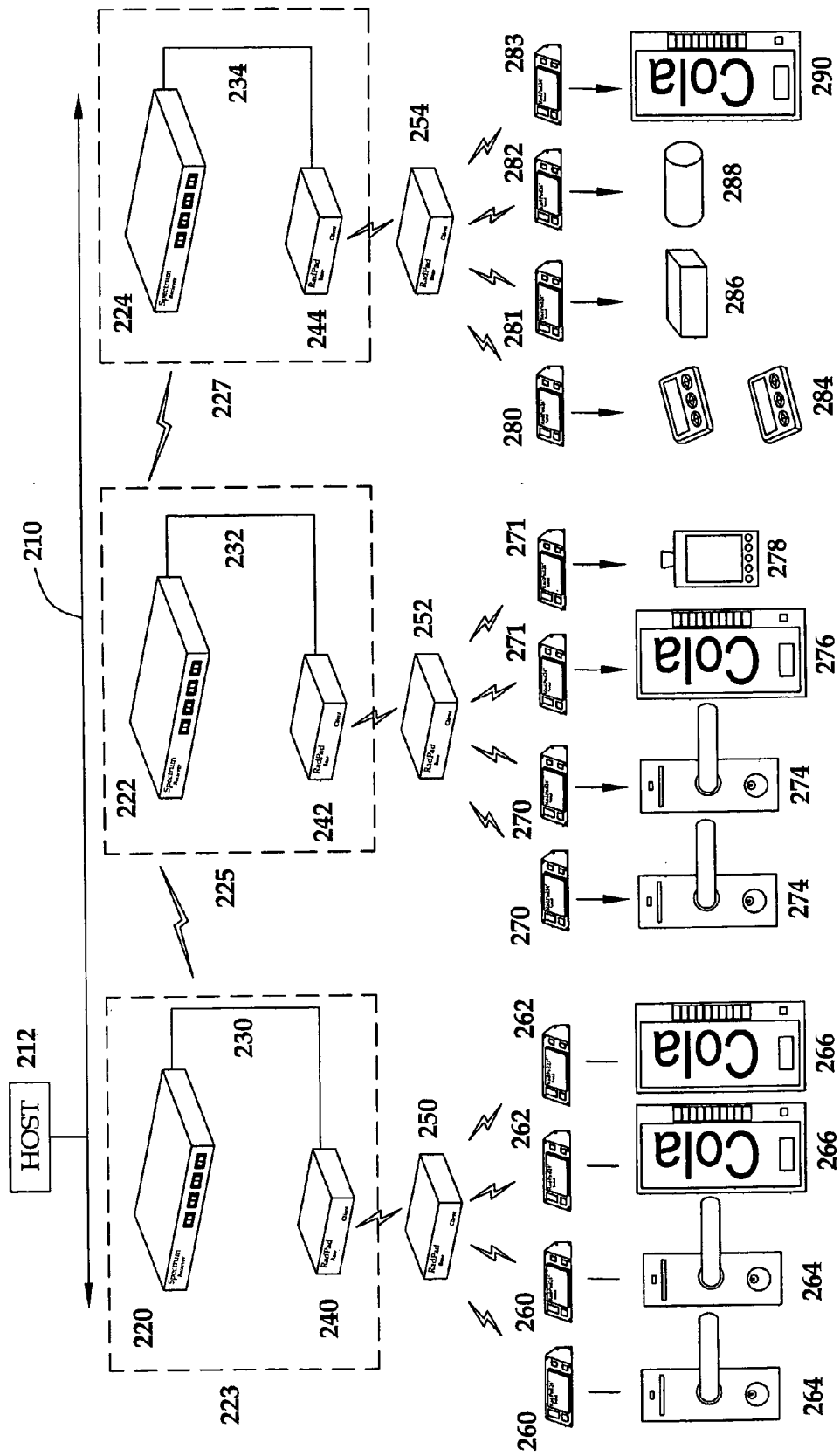
FIG. 2 is a diagram of another multi-tier communication system built in accordance with the principles of the invention.

FIG. 2 illustrates another multi-tier communication system 200 in accordance with the present invention. The system comprises a wired LAN 210, a host computer 212 connected to wired LAN 110, a plurality of first-tier base stations 220, 222, and 224, a plurality of second-tier base stations 240, 242, 244, 250, 252, and 254 and various types of wireless units 264, 266, 274, 276, 278, 284, 286, 288, and 290, with each of wireless units having respective wireless module 260, 262, 270, 271, 272, 280, 281, 282 or 283.

Multi-tier system 200 is similar to multi-tier system 100 of FIG. 1. In FIG. 2, however, first-tier base station is integrally formed with second-tier base station. For example, combined base station 225 includes both first-tier station 222 and second-tier station 242 in a common enclosure. Inside base station 225, first-tier station 222 may be linked to a separated second-tier station 242 via a serial link. Alternatively, the first-tier station and the second-tier station may be manufactured integrally together as a single unit. While not all the combinations are individually illustrated, it will be understood that all the configuration combinations discussed in FIG. 1 are equally applicable to the configurations in FIG. 2.

Figure 3:
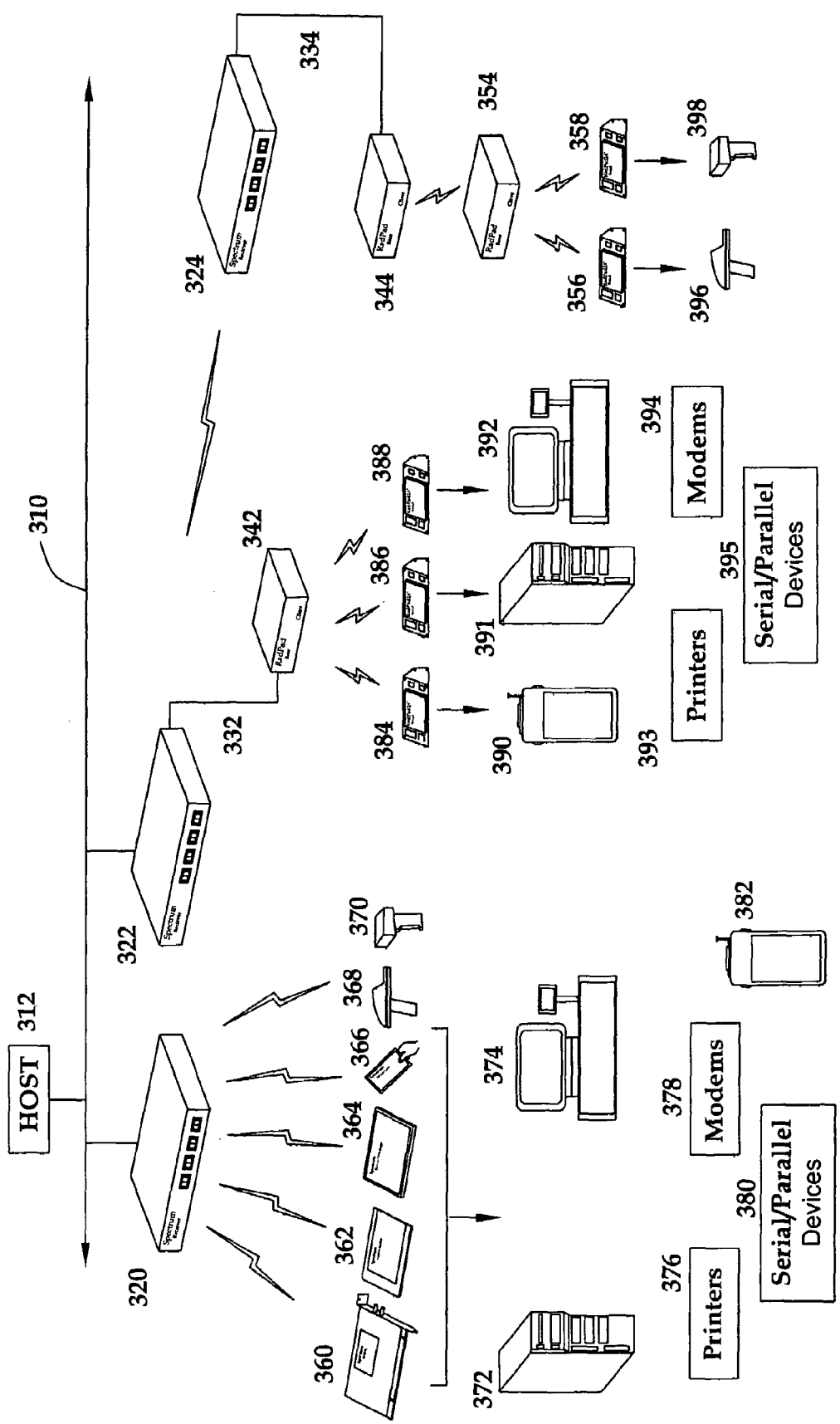
FIG. 3 is a diagram of yet another multi-tier communication system built in accordance with the principles of the invention.

FIG. 3 illustrates yet another multi-tier architecture. Multi-tier system 300 comprises a wired LAN 310, a host computer 312 connected to wired LAN 310, a plurality of first-tier base stations 320, 322, and 324, a plurality of second-tier base stations 342, 344, various types of relatively long range wireless units 368, 370, 372, 374, 376, 378, 380 and 382, with each of wireless units having respective wireless communication module either built in as in 368 and 370 or in a module such as 360 (in an ISA card), 362 (in a PC card), 364 (in an Ethernet client bridge) or 366, and various types of relatively short range wireless units 390, 391, 392, 393, 394, 395, 396 and 398, with each of wireless units having respective wireless communication module 384, 386, 388, 356 or 358.

As illustrated in FIG. 3, the long range and short range wireless units may be computers, point of sale devices such as cash registers, printers, modems, serial/parallel devices, terminals, or data collectors such as bar code, RFID, magstripe, or smart card readers. They may also be hotel door locks, vending machines, security locks, handheld terminals, pagers, phones, building controls, sensors or telemetry devices.

While specific applications with specific architecture are discussed for sake of simplifying the explanation, it will be understood that any one or combination of the architectures and variations on the components and subcomponents discussed in conjunction with FIGS. 1—3 may be used in any application discussed below.

Figure 4:
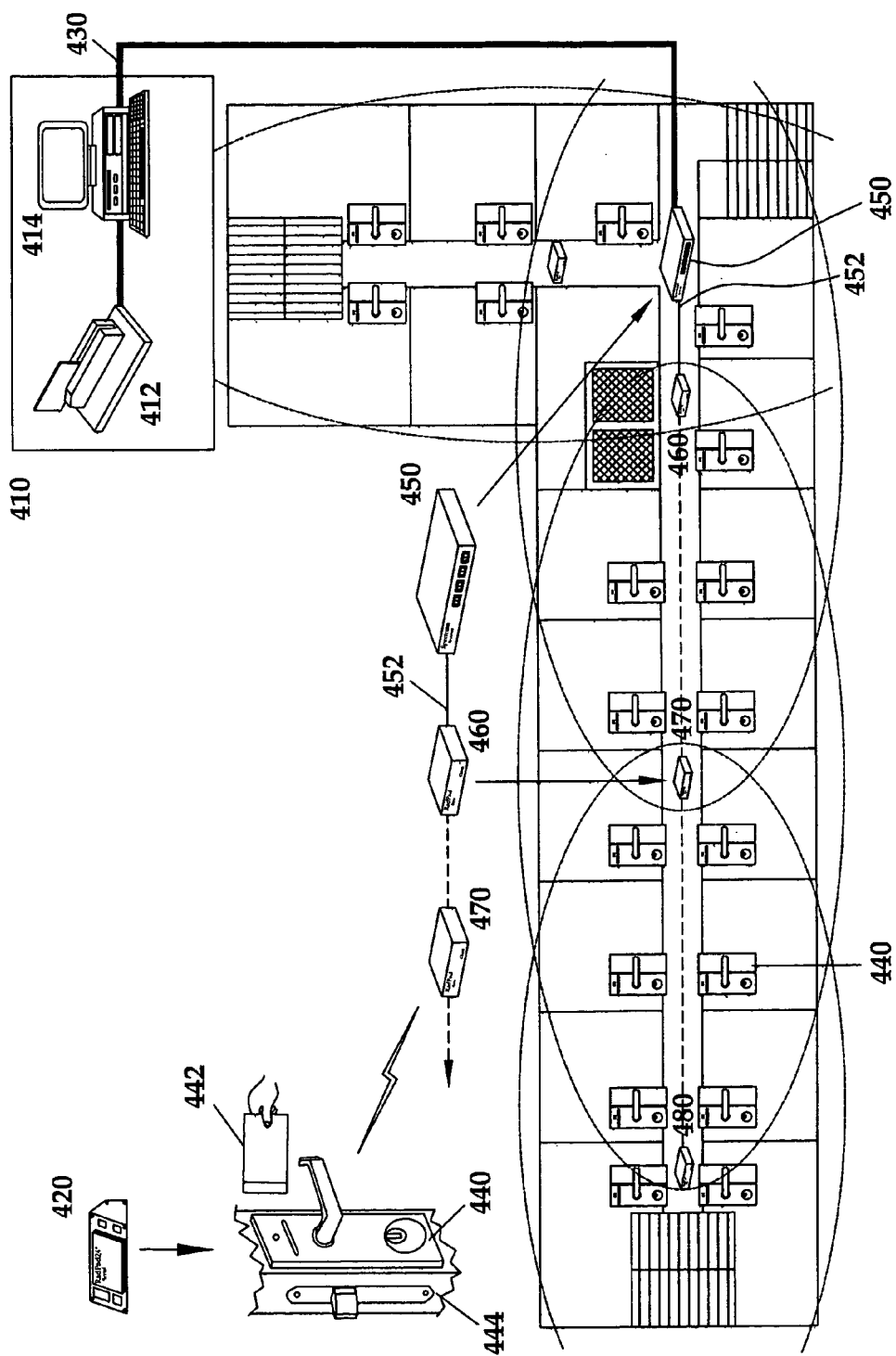
FIG. 4 is a diagram of an application adapted to a hotel environment in accordance with the principles of the invention.

FIG. 4 illustrates a specific application of the multi-tier communication architecture discussed above. In this application, the application system includes: hotel front desk 410, one or more long range first-tier base station 450, one or more short-range second-tier base stations 460, 470 or 480 and one or more hotel door locks 440.

Generally, the system operates in the following manner. Each floor of the hotel would generally have one first-tier base station, and a plurality of second-tier base stations will be linked serially and in parallel to the first-tier base station. For example, second-tier base stations 460, 470 and 480 are linked serially to first-tier base station 450, whereas second-tier base stations 460 and 490 are linked to first-tier base station 450 in parallel. Second-tier base stations 460 and 490 may be linked to first-tier base station 450 by wire as discussed in FIG. 1. In the alternative, second-tier base stations may be integrally encased with the first-tier station as in FIG. 2. It will be understood that any one of the configurations discussed in conjunction with FIGS. 1–3 may be used in the embodiment shown in FIG. 4.

Each door lock (generally the main door) for each room would be a wireless unit with a wireless communication module. For example, door lock 440 includes a wireless communication module 420 for communication with second-tier base station 460, 470, 480 or 490. Door lock 440 also includes additional circuitry: a sensor for detecting conditions of the door (open or closed); locking mechanism which, in response to the control signals from the front desk (or the administrator) transmitted to the door lock through wireless communication module 420, is adapted to configure the lock mechanism as needed.

One operation of this system is follows. A hotel guest would arrive at the front desk. The guest is checked in and the guest is given a door key 442 in the form of a card, programmed by a programming unit 412. Programming unit 412 may be a magstripe type or punch hole type or any other programmable key. Front desk computer 414 would program a unique code to key 442, depending on the room being assigned and a password. Preferably, at the time of such programming, front desk computer would also communicate with the door lock of the room being assigned via wired LAN 430, first-tier base station 450 and one or more second-tier base stations, thereby programming the door lock at the time the guest is being checked in. This ability to program each room door wirelessly allows a lot of flexibility. For example, after guest walks up to the room he or she is assigned, the guest realizes that he or she wants another room (perhaps the room is a smoking room and he or she wants a non-smoking room, or vice versa). In this situation, the guest would could call the front desk from the room initially assigned and request another room. The front desk personnel would be able to assign a new room to the guest and communicate with the door lock of the new room being assigned to accept the guest's existing key. In this way, the guest can use the key he or she already has and does not need to even come down to the front desk.

In another use of the system, the wirelessly controlled door locks may also be useful in emergency situations. For example, the doors of all the rooms (or of certain sections of the hotel) may automatically become unlocked during a fire so that the hotel, fire-fighter or other emergency personnel may easily get to individual guest rooms.

Also, the door locks may be continuously monitored through the network for security purposes. For example, if a door is left open for any extended period of time, a security guard may be sent to the room to check to see if any While the application of FIG. 4 is particularly useful in a hotel environment, other applications also possible. For example, in light of the increase in school violence, security has become a top concern for schools and local communities. Applying the system of the present invention to the school environment, all the doors into a school building may be easily monitored by relatively few people. A security guard may be quickly dispatched to any door that is not supposed to stay open. Similar applications may be used in hospitals, banks, retail and convenience stores, private homes and businesses.

In another variation of the embodiment disclosed in FIG. 4, in addition to the door locks, wireless units may be thermostat controls in individual guest rooms. In this embodiment, each thermostat control in each guest room would include a wireless communication module for communication with a second-tier base station. The second-tier base station would either directly or indirectly through a series of other second-tier base stations link with a first-tier base station, which in turn is directly or indirectly connected to a wired LAN. In this way, the temperatures in guest rooms may be individually monitored and controlled. This feature would be useful in a variety of ways: (1) Energy savings: The hotel could realize substantial energy saving by having the vacant room immediately go into energy saving mode as soon as the guest checks out until the next check in; (2) Flexible control: The hotel could even provide customized temperature setting (e.g., relatively warm, standard or relatively cold) in advance for guests so that upon arrival in their assigned rooms, the room temperature will be already pleasant for the particular guest. A guest's temperature preference may be obtained: (1) when the guest makes the room reservation; (2) in a survey during a check-out for the next visit; or (3) monitored electronically using the thermostat monitors and wireless modules of the present invention for next visit.

Figure 5:
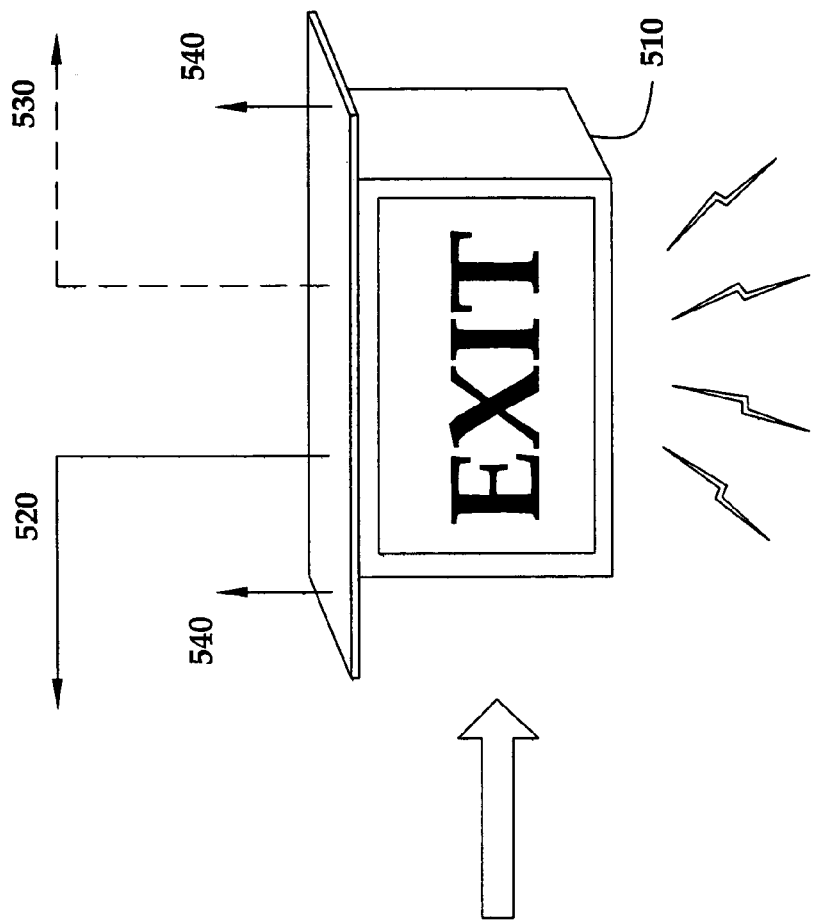
FIG. 5 is a diagram of various enclosures for the base stations of the present invention.
Figure 5:
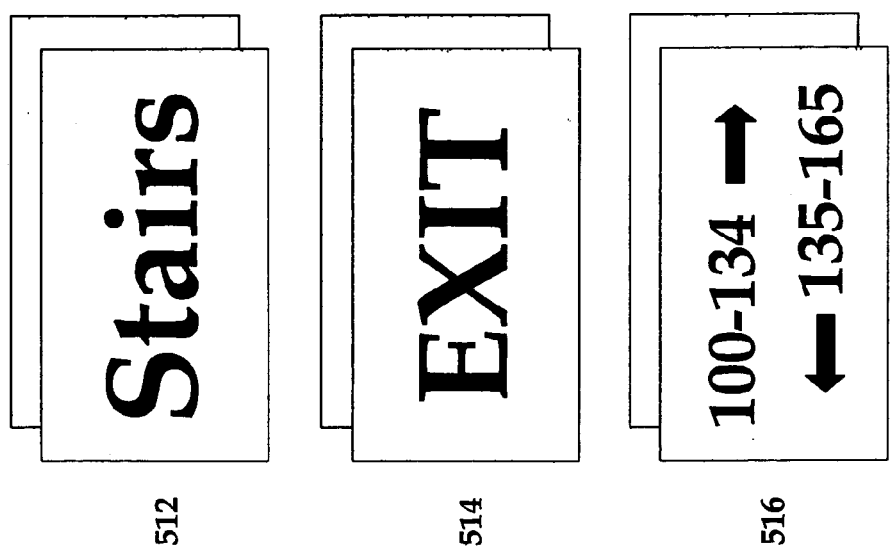

FIG. 5 shows various disguises or enclosures for first-tier and second-tier base stations, antennas and other network hardware. The enclosure system of FIG. 5 includes: overall enclosure 510, power line 520, fasteners 540 and LAN connection 530. As shown in FIG. 5, the outside of the enclosure in a hotel would typically include panels with various signs such as "EXIT", "STAIRS", directions to the rooms "100–134->" or "<-135–165". The enclosure would typically cover the base station, as well as an alarm and a light source to make the sign visible. Power line 520 provides power to the base station, the alarm and the light source. LAN connection 530 could be a wired or wireless connection from the base station to the LAN. Other attachment or disguise possibilities include: water coolers, vending machines, fire alarms and public announcement speakers.

Figure 6:
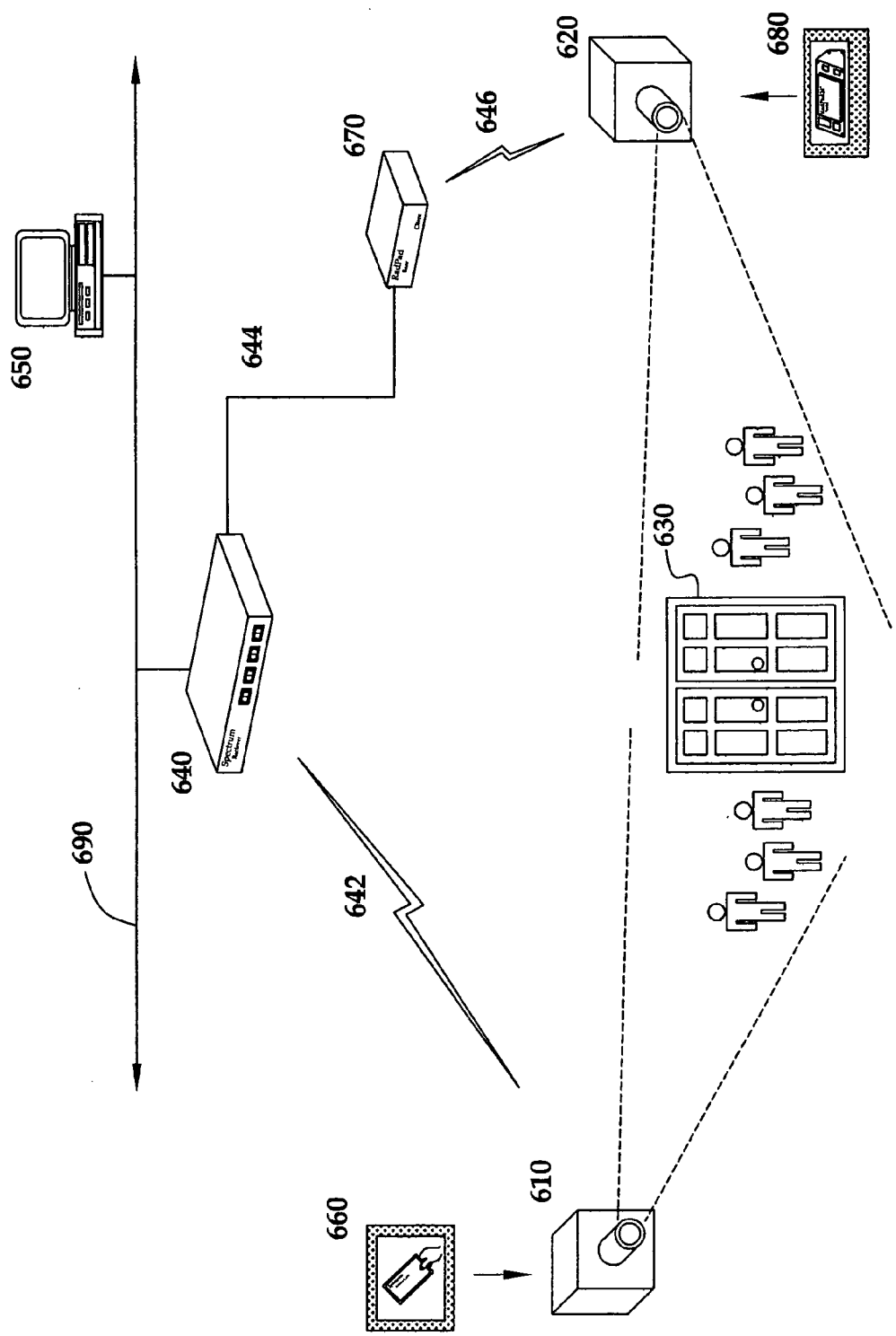
FIG. 6 is a diagram of a surveillance camera application in accordance with the principles of the invention.

FIG. 6 illustrates another application useful in security-sensitive environment. This system allows video security cameras to be placed anywhere without wiring, in places such as hotels, hospitals, schools, banks, retail and convenience stores, private homes and businesses. Security system 600 comprises a wired LAN 690, a host 650, video monitor(s) 652, a first tier base station 640, a second tier base station 670 and video cameras 610 and 620. Video camera 610 includes a wireless communication module 660 for communication with first-tier base station 640. To increase the range, there may be placed additional first-tier base stations between video camera 610 and first-tier base station 640. Video camera 610 and its communication module 660 are particularly useful in situations where high data throughput (such as high video resolution) is desired and/or the video camera is located relatively far from the first-tier base station. On the other hand, video camera 620 includes a wireless communication module 680 and communicates with a second-tier base station 670. Second-tier base station, in turn, is wiredly connected with first-tier base station 640. In the multi-tier surveillance camera system, adaptive rate wireless video monitoring is achieved. Thus, video capture rate varies based on wireless network traffic—when the network use is light, fast picture refresh is obtained, whereas when there is heavy network use, slow picture refresh is obtained. The refresh rate can also be changed via remote command or program. For example, certain alarm or trigger event may boost the refresh rate of select cameras to maximum.

The video surveillance system of FIG. 6 may be used in conjunction with the system described in FIG. 4. For example, when the system of FIG. 4 detects that a certain door is being opened, the surveillance camera system of FIG. 6 may bring that particular door to the main monitor and alert the security guard by some indication (such as an audible beep or visual indication). At the same time, the refresh rate and the resolution of that particular video camera may be maximized or otherwise adjusted for better viewing. The systems of FIGS. 4 and 6 may additionally include a wireless intercom system for voice communication. Thus, a guest (parent at a school) attempting to enter the premises through an unauthorized door may be directed to another door for entry.

Figure 7:
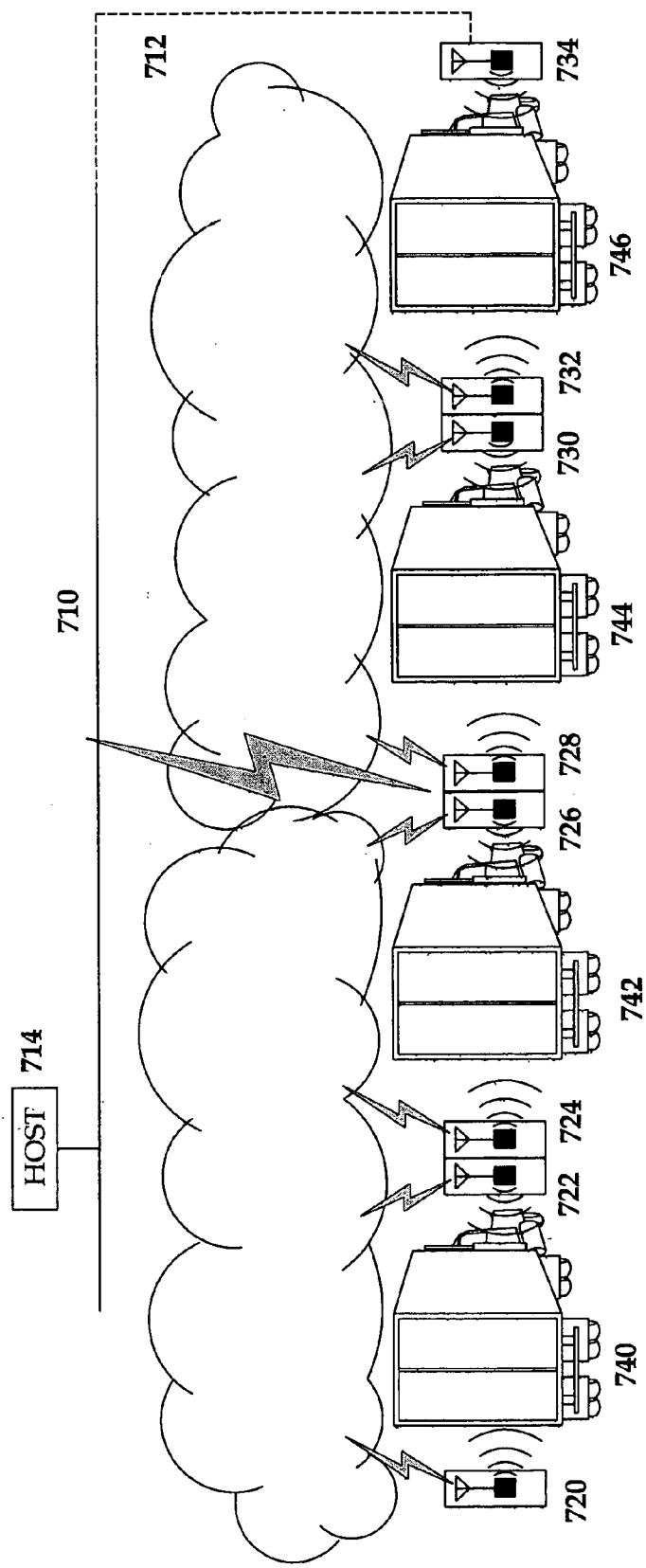
FIG. 7 is a diagram of an RFID application in accordance with the principles of the invention.

FIG. 7 illustrates another multi-tier communication system as applied to a radio frequency identification ("RFID") data collection system. Many warehousing and end-user receiving facilities consist of multiple adjacent portals through which goods are transferred. In a conventional system, multiple (adjacent) portal/gate RFID readers are connected to a local or wide area network (LAN/WAN) via a host which is wired serially to each gate reader. An alternate embodiment of conventional systems is parallel connection of each RFID reader to the host. This type of wired installation adds significant cost and installation time. In addition, it generally requires changes to the physical environment in order to add the cabling and supporting equipment.

The system illustrated in FIG. 7 provides wireless connectivity of multiple adjacent data collection devices (e.g. RFID and/or barcode readers.) In order to maintain lowest infrastructure cost, portal readers that are within a few meters of each other can utilize minimum cost second-tier radios that will provide peer-to-peer connectivity. Each data collection device will transfer its data to a nearby reader in a hand-off fashion until the packets arrive at the master device which has longer range/higher bandwidth connectivity (e.g. Spectrum 24) to a host. If a particular reader is busy, the data can be buffered. The host can be connected to a WAN or the Internet in order to provide remote visibility of the data capture activities at the warehouse. Using the system of FIG. 7, the infrastructure installation cost is lowered and the cost of re-location or expansion (many warehousing facilities are rented and major modifications are not generally allowed) is reduced substantially.

Figure 8:
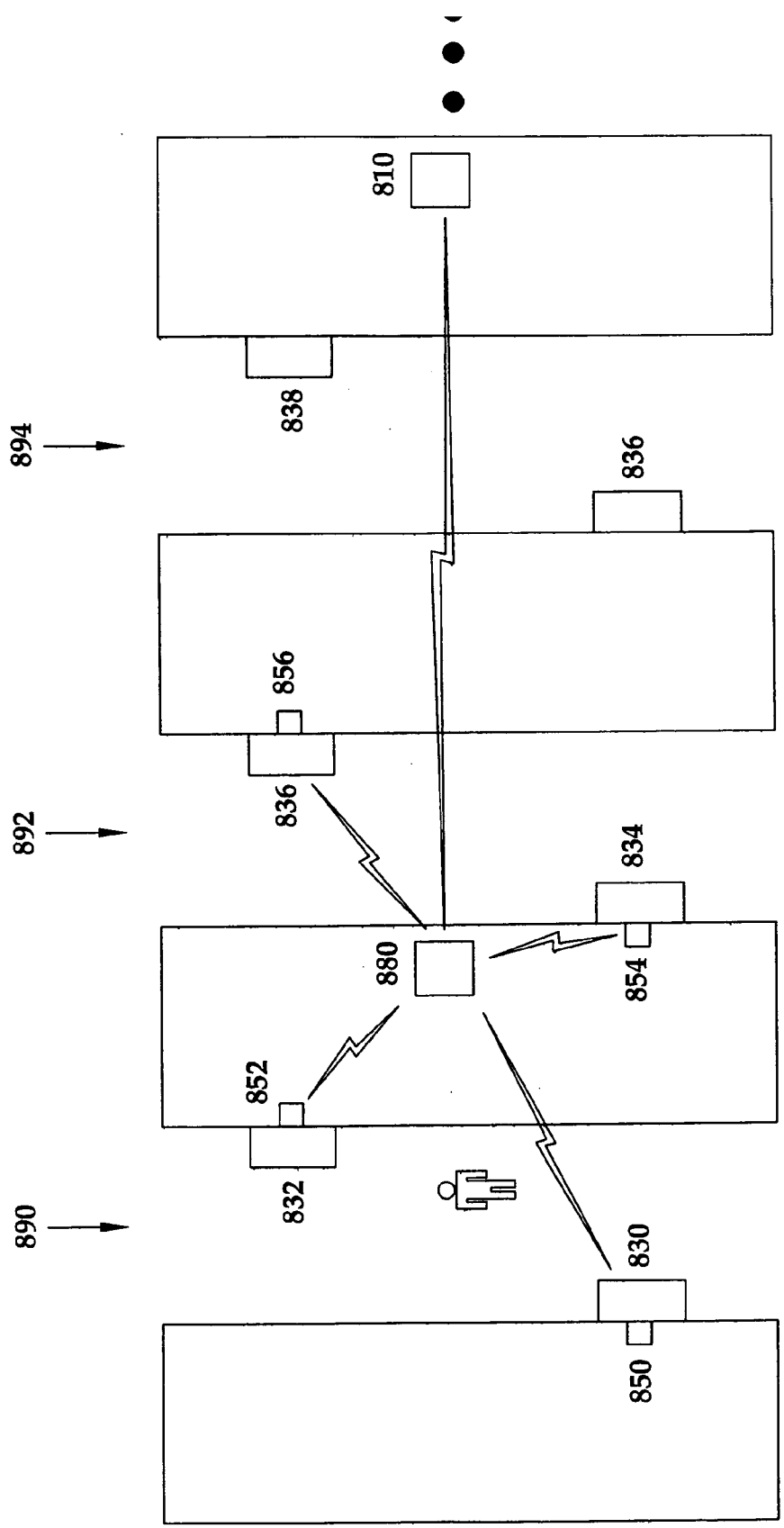
FIG. 8 is a diagram of a supermarket price checker application in accordance with the principles of the invention.
Figure 9:
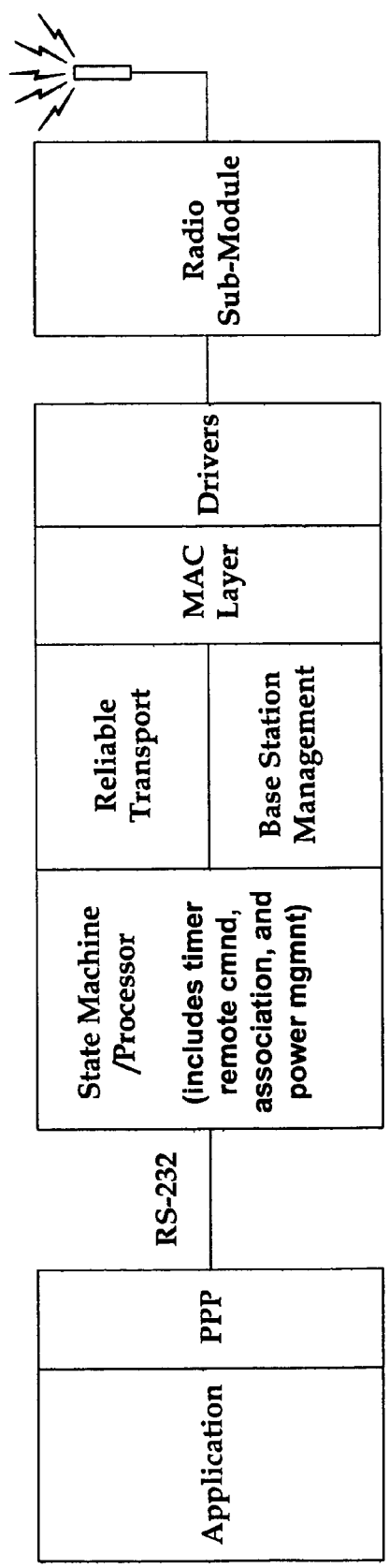
FIG. 9 is a block diagram of the components in the wireless unit.
Figure 10:
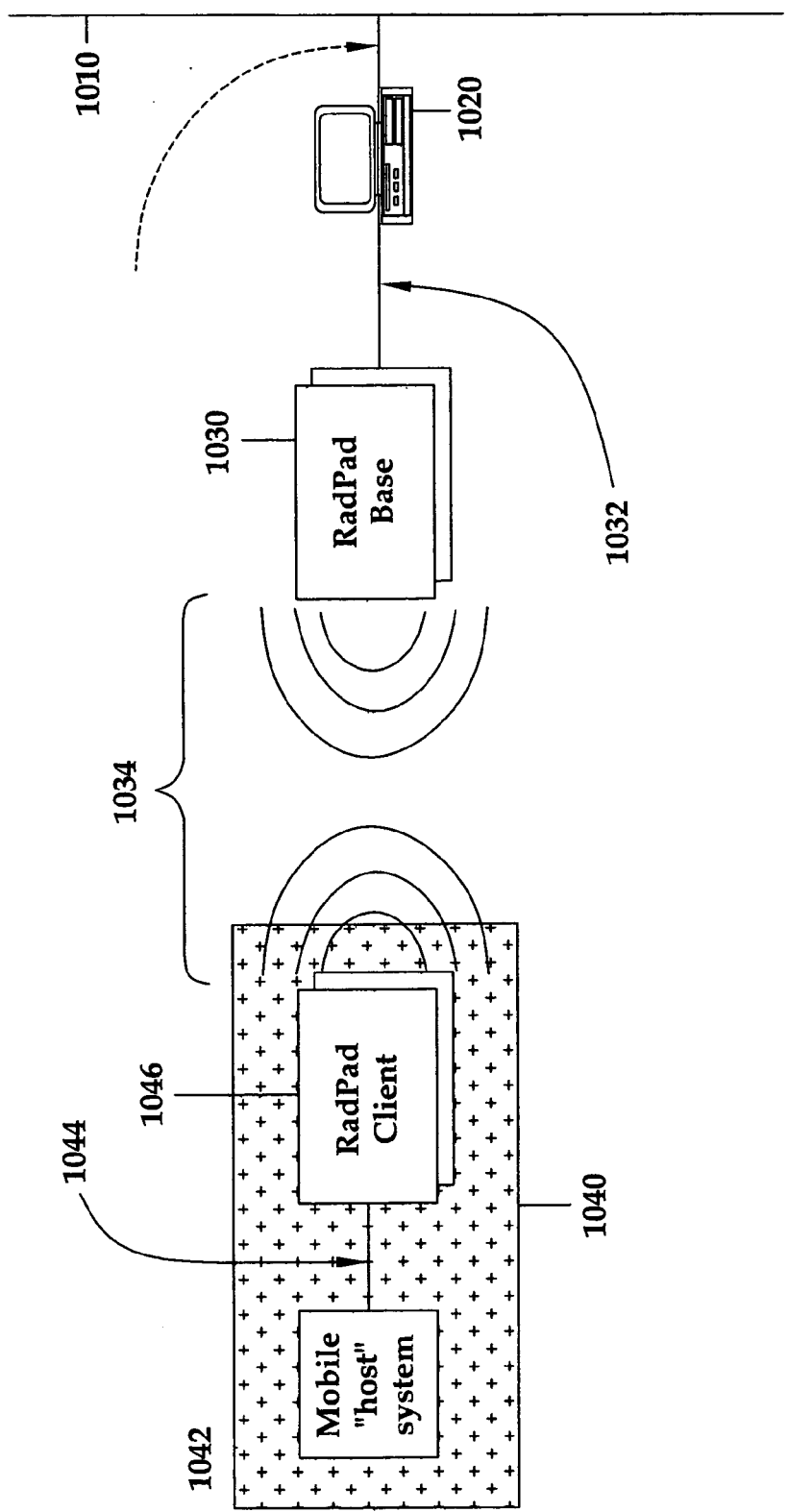
FIG. 10 is a block diagram of the components used in the second-tier wireless communication system.
Figure 11:
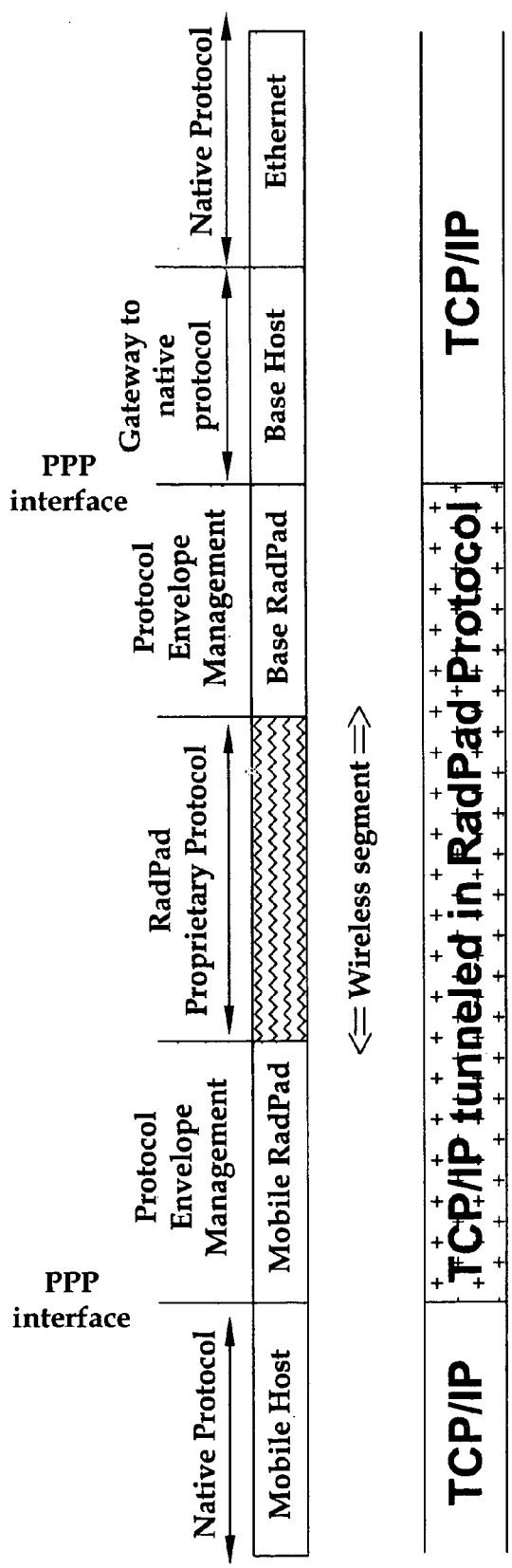
FIG. 11 illustrates the protocol used for the second-tier wireless communication.
Figure 12:
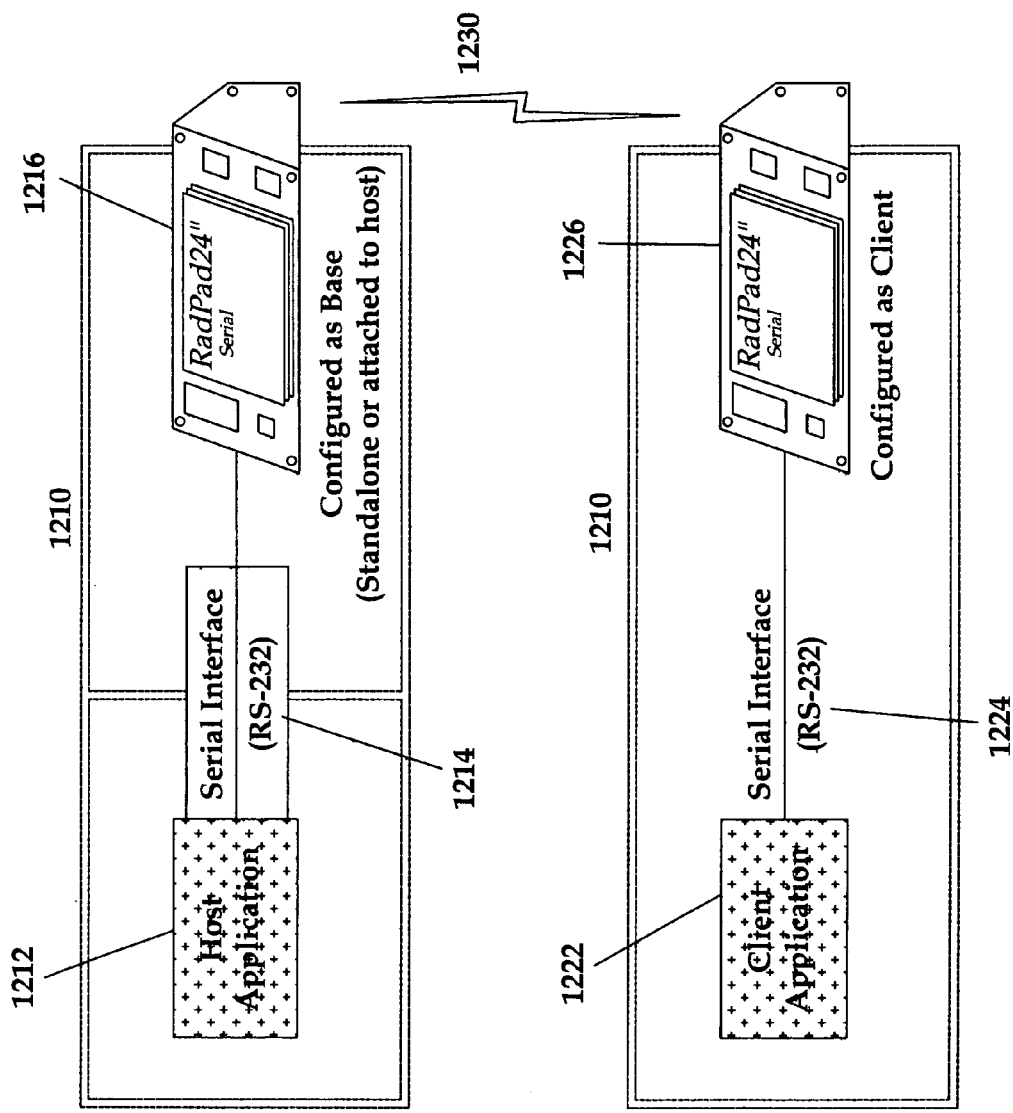
FIG. 12 is a block diagram of the components used in the second-tier wireless communication system.
Figure 13:
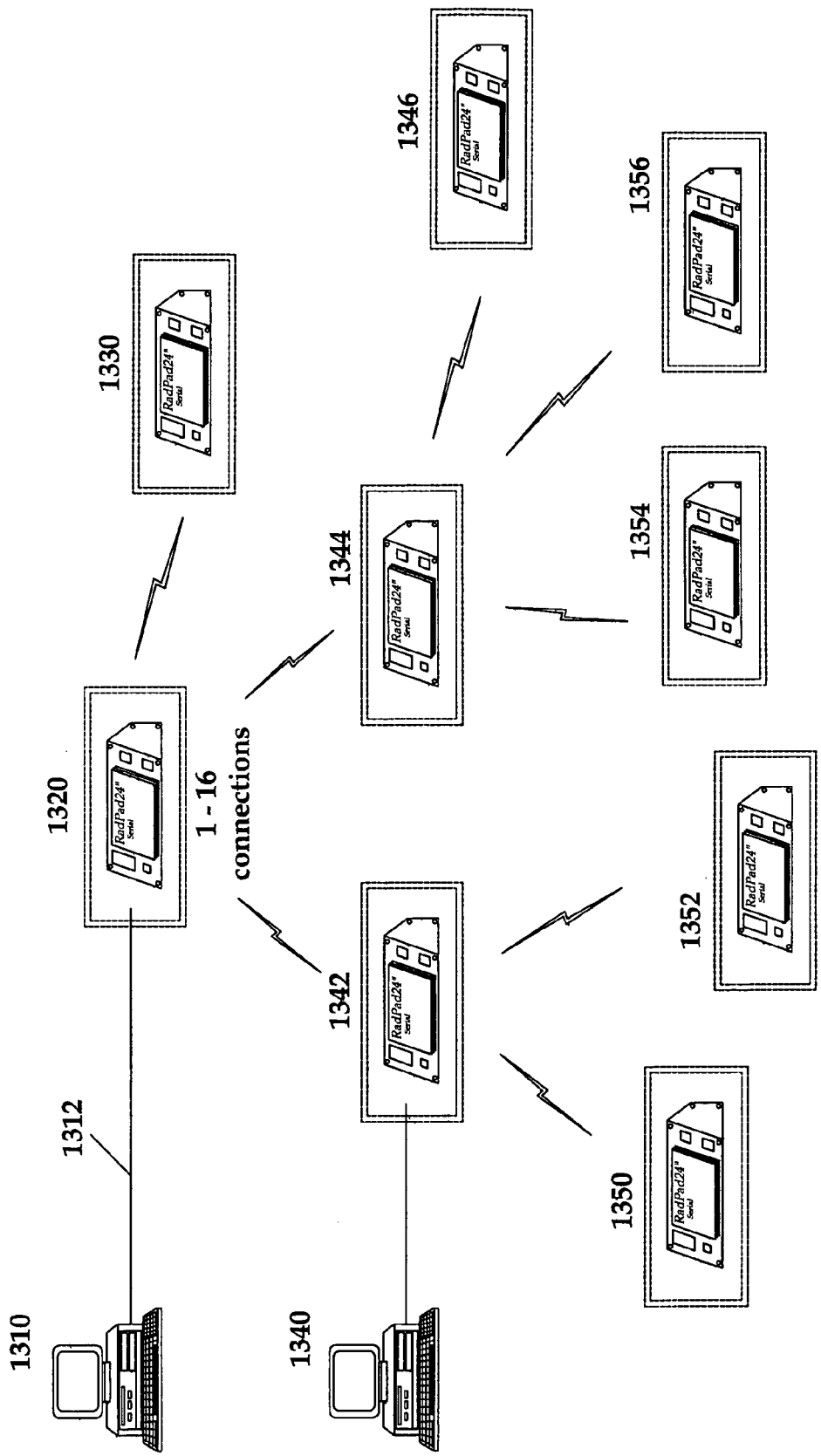
FIG. 13 is a block diagram of a second-tier communication system.

FIG. 8 illustrates yet another multi-tier communication system as applied to a retail price checker system. Toy stores and other variety of retail stores have price checking stations set up where a customer would generally scan the bar code on an item (such as a toy) to find out the price. Such price checking stations free up store clerks to do other tasks than answering price questions. The price checking station also may be more versatile and offer additional information about the product (such as any sales information and any other information). However, retail stores generally do not have the price checking stations in every aisle due to the high wiring and installation costs. The system shown in FIG. 8 provides a way to provide such a price checking station on every aisle relatively inexpensively. Because the "price checking station" can become more versatile and provide any type of interactive information, it will be referred to as "customer inquiry station" hereinafter.

FIG. 8 shows a number of aisle sections 890, 892, and 894, each of which section includes one or more customer inquiry station. For example, aisle section 890 includes customer inquiry station 830 and 832. Each customer inquiry station includes (or attached to) a wireless communication module for second-tier communication. For example, customer inquiry stations 830, 832, 834, and 836 may be set up to communicate with second-tier base station 880 via respective wireless modules 850, 852, 854, and 856. Similarly, additional second-tier base stations may be set up to communicate with other customer inquiry stations (shown in FIG. 8 as a dotted line). The customer inquiry station would also typically include: (a) a data entry device, such as a bar code reader, an RFID reader, a mouse, or a keyboard; and (b) an output means such as a monitor, an LCD display, or a printer. In general, a plurality of second-tier base stations would be linked to a first-tier base station 810. First-tier base station with the relatively longer range would be either wiredly connected to a LAN or wirelessly connected to another first-tier base station for indirect link to a LAN.

Heretofore, various multi-tier systems using first-tier base stations and second-tier base stations and second-tier communication modules have been discussed. As discussed above, the first-tier base stations in the 900 MHz and 2.4 GHz bands are widely available on the market. Examples of such radio frequency systems are discussed in WCCN Wireless Handbook—RF Terminals & LANs (1997 Third Edition). The following section is a detailed description of one embodiment (referred to as the "RADPAD" system) of the second-tier base station and the corresponding second-tier communication module in the wireless unit that may be used in the present invention.

1. Introduction 1.1 Abbreviations/Acronyms

Cordless Base (CB or "base"). The "base" station is requisite to support a BSS entity. This central element manages the associations of all stations in a BSS and communications among them.

Cordless Station (CS or "station"). Any product that incorporates a RADPAD for cordless application operation.

RadPad. Radio Packet Assembler/Disassembler.

TIM. Traffic Indication Message. An element of the CB Beacon frame indicating that specific associated stations had buffered messages waiting for delivery.

BSA. Basic Service Area.

BSS. Basic Service Set is the active collection of a CB and associated CS devices.

BSSID. Basic Service Set Identifier is the key addressing element that defines the bounds of any one BSS. Typically this value will be the Node ID of the CB component plus one byte determined by the CB at power up time.

ESSID. Extended Service Set Identifier. This is the identifier of a collection of associated BSS systems.

PPP. Point-to-Point Protocol (IETF RFC-1661).

TSF. Timing Synchronization Function. The RadPad protocol element used to synchronize all associated stations.

SID. Station Identification code is the value (between 1 and 254) assigned by the base to each associated CS entity. This value becomes a bit offset in the TIM to indicate the existence of queued frames at the base.

RCP. RadPad Command Protocol is the command set used to configure the local RadPad components for either base or CS.

RDP. RadPad Data Protocol is the nominal "data" format between a RadPad entity and its serial port client.

RRCP. RadPad Remote Command Protocol is the service by which one RadPad serial point client may remotely configure remote RadPad.

MAC. Media Access Control.

2. Introduction.

2.1 RadPad Functional Overview.

The RADPAD system is a discrete, embedded, & low-cost PCB product designed for support of wireless communication for cordless devices without requiring the traditional full LAN software stacks. RADPAD is intended for portable, battery powered equipment and therefore, includes a power management design feature. RADPAD is a compound device that combines a radio (ISO physical layer) along with software which runs the RADPAD protocol (ISO Data Link layer) on a digital section that is "host" accessed via a standard serial interface. Serial port access to configuration and data link services uses either (1) the Point-to-Point Protocol (PPP) frame format for transferring data on and off the RADPAD unit or (2) asynchronous character serial I/O with support for "command" and "data" modes.

The RADPAD protocol functionality and serial application programming interface (API) are specified herein. The API is defined by the interface to the serial port as discussed in Section 4. The electrical interface is specified by the serial connector as discussed in Section 5 and RF (antenna) connector as discussed in Section 7.

The RADPAD API defines both configuration commands and data formats. The commands allow a hosting device to configure RADPAD parameters such as RF channel, addresses, error control, and timing parameters. Any data sent to the serial port will be sent across the radio link to another RADPAD selected by the user. Discrimination between data and command streams is achieved by selected PPP frame elements or current device mode as described in Section 3.

The RADPAD RF data rate is 50 Kbps and is capable of a minimum range of 50+ feet (typical open environment) with low power consumption (1 mW & 10 mW). The RADPAD radio provides frequency tuning from 2400 to 2500 MHz in 1 MHz increments. The large number of channels provides a means for avoiding interference and therefore ensures a reliable RF connection over the entire RF range. Single frequency radios have no means of avoiding interference and therefore are subject to dramatic reduction in range without recourse.

The addressability of any one station can be extended by compounding BSS entities that utilize the "repeater" capability of a base. This extends the effective range of any station in communicating with a designated BSSID to beyond the 50+ foot radius. In this configuration, each station is associated with a particular base, but the final destination of the frames may be an ESS base or any other station that is accessible through the local base that is acting as a repeater. (see FIG. 2).

2.2. RadPad Implementation Perspective

While several alternative implementations are possible, the following could be one implementation.

2.2.1 RadPad Hardware Interface—

The host system must provide 5 volt DC power to the board for serial and radio enabling. The host system must be able to properly interface with the 10 pin serial connector interface. The host system must provide an adequate antenna for the RF interface. Symbol's units have a built-in on-board antenna, but is not intended to support maximum range applications. Configuration with a 2.4 GHz high gain antenna will maximize the effective range.

2.2.2 RadPad Software Interfaces—

The host system must be able to properly configure the RadPad from persistent information known to the host. The host system must provide a mechanism for inputting the (1) client/base operating frequency; (2) the ES identification to which it will belong; and (3) the target "partner" user ID. The host system may also, optionally, wish to support remote management of devices in the ESS.

3. Protocol Description 3.1 Basic Service Area

The basic cordless network cell is called a BSA (Basic Service Area). A collection of stations within a BSA that are associated with a common CB or base form a Basic Service Set(BSS). The size of a cell is dependent on the environment and the characteristics of the wireless transceivers. Each BSS has a unique identifier (BSSID) were the BSSID is the NodeID of the cordless base with the addition of a single byte chosen by the base each time it is powered up.

3.2 Cordless Station

This component is the application agent that utilizes the RADPAD as a communication link. Provision is made in the design of the station to specify the designated ESSID of the base (typically, via scanning a special bar code). When powered up and properly configured, the RADPAD will: (a) associate with the target base (matching the ESSID values) and (b) provide best-effort datagram transmission and reception across the radio link to a designated "partner". By design, the associations and link state information will be preserved across RadPad power cycles.

3.3 Cordless Bases

A Cordless Base (or base) is always present in a cordless cell and provides the following basic functionality: (a) Association functions which allow a station to join a particular base's BSS; (b) Synchronization functions which ensure that all stations currently associated with the base are synchronized on a common clock. This synchronization is used, for example, in supporting repeater and power management; (c) Frame buffering and other associated power-management functions for power-conserving stations; (d) Application gateway services to any attached "host" device; and (e) Manage ESS associations. A repeater base is also a station to a superior BSSID and will forward messages to this address if the local addressing cannot be resolved. The base is the essential element in the operation of a BSS and must be the first device activated. Should this component lose power or fail for any reason, the entire BSS will fail, requiring a re-association of each station upon reactivation. For this reason, implementation of the base system should consider fault tolerant elements to minimize operational problems.

3.4 Basic RadPad Protocol Architecture

RadPad uses positive acknowledgments for detection and retransmission of lost frames. Since multiple frames are often involved in a single exchange, the concept of a MAC Protocol Data Unit (MPDU) is introduced. An MPDU may, for example, constitute either Data and ACK frames. There is provision for support of broadcast frames (e.g., Beacons) which require no acknowledgment. There is no support for multicast addressing.

There is no notion of a "session" or "virtual circuit" supported by this architecture. Only datagram transport reliability is assured by the RadPad, and that only if the MAC protocol is not called upon to forward frames.

3.5 MAC Acknowledgments

The MAC-level Acknowledgment allows the detection of a lost frame and recovery by retransmission at the MAC level transparent to the application level. All data transmissions use the Request/Response (Data+ACK) architecture, except for broadcast frames sent to stations. The singular exception is broadcast frames which are generated by stations and are to be forwarded by a base will be acknowledged by the base.

Since MAC-level acknowledgments and re-transmissions are implemented, there is the possibility that a frame may be received more than once. Such duplicate frames are filtered out by the receiving MAC. Duplicate frame filtering is facilitated through the inclusion of a Sequence field within the Data and ACK frames.

RADPAD station is designed such that the association state and frame sequence number is preserved across RADPAD power cycles. This design optimizes performance of the host device and minimizes power consumption.

If no acknowledgment is received within a predetermined "Acknowledgment Window" (approximately 3 milliseconds) after a frame has been transmitted, the original frame is retransmitted. This process will continue until a configurable number of re-transmissions has been reached.

Confirmation or error indications are returned to the data source as discussed in Section 4 below.

3.6 Time Synchronization

A critical function within RADPAD is the synchronization of time among all stations within a BSS. This is used for important functions such as power management.

The base is the timing master and performs the Timing Synchronization Function (TSF). To synchronize the stations in a BSS, the base sends out periodic frames called Beacons. Receiving stations coordinate all of their activities to the arrival of these frames.

3.7 Power Management

An essential part of the RADPAD is the ability to conserve station power consumption as much as possible. This is achieved by the following architectural features: Synchronize all stations operating in Power Save Mode within a BSS. Allow stations to power down their transceivers for most of the time. Temporarily buffer frames for "sleeping" stations at the base. Announce the buffered frames to the stations at regular predetermined intervals, so that a station can sleep until it wishes to hear such an announcement, at which point it can take steps to ensure that any buffered frames are properly received.

The basic approach is for the base to temporarily buffer frames for stations will only transmit them in response to a poll from the station. The stations which have buffered frames within the base are identified in a Traffic Indication Map (TIM), which is periodically generated by the base as an element within a Beacon. A station may determine that a frame is buffered for it by listening to a TIM and can then take action to ensure that the frame is forwarded from the base.

Beacons (with TIMs) are periodically generated by the base, separated by a specified time interval; "Beacon Interval" (which is a BSS parameter known by all stations within the BSS upon association with the base). Stations will transmit a Poll frame to the base, which will respond by transmitting the corresponding buffered frame.

It is anticipated that different networks may set the Beacon Interval to different values depending upon the nature of the applications being supported. Because it is a key architectural element, proper establishment of the Beacon Interval greatly impacts observed performance.

3.8 TIM Transmissions

Beacons containing a TIM are sent at regular intervals and will identify the stations for which traffic is pending and buffered in the base. This information is coded in a virtual bitmap. To allow efficient coding, every station is assigned a Station ID code (SID) by the base as part of the "association" process. The TIM will identify those stations for which frames are buffered by setting bits in the virtual bitmap which correspond to the appropriate SIDs.

3.9 Blackout Interval

In the case of systems with a battery-powered base, the base may also need to conserve its own power. This will involve powering itself down for certain specific intervals. The base can inform the stations when it is going to be powered down. This information is conveyed in a Blackout Interval element carried in a Beacon frame, which identifies the start and end points of the Blackout Interval.

Stations will not transmit during the Blackout Interval. If a station does not hear a particular Beacon and consequently does not know the Blackout Interval, it carried in a Beacon frame. For systems which are not concerned with base power management the Blackout Interval can be set so the base is constantly powered and therefore always able to receive a packet. The stations are therefore able to send at anytime except when the base is sending a Beacon. This state is optimal for overall BSS performance.

3.10 Address Assignment

Each station has a unique 24 bit (3 bytes) identifier called it's NodeID. When a station associates with the base, it must first know the ESSID of the base (via a mechanism which is outside the scope of this document; the user can configure the ESSID's of both the station and the base). After receiving an Associate Command, the station RADPAD waits for a Beacon from a base whose ESSID matches the station's assigned ESSID value. When it finds one, the station generates an Associate Request addressed to that base and containing it's own NodeID. The base generates an Associate Response and it serves as the acknowledgment to the station's Associate Request transmission. The Associate Response uses a broadcast destination address field, but is only interpreted by the station with the designated NodeID.

The basic association process is the following sequence. The station determines its ESSID through a process external to this specification and the station ESSID is programmed by the ESSID Command. After receiving an Associate Command, the station waits for a beacon to find out the BSSID of a base that has been assigned the same ESSID as the station. Then it generates an Associate Request, using the ESSID and BSSID it has discovered, and including its NodeID within the frame body. Base returns an Associate Response to the station with the Beacon Interval within the frame body. This frame is not acknowledged. If the station does not receive an Associate Response, it will retry the Associate Request (up to a configurable maximum number of times).

Station configuration and association information is stored in Non Volatile Memory. Associations once made, remain valid until the Initialize Command is executed.

When a station may have an assigned ESSID, but doesn't know the frequency, the RADPAD provides the "Find Base Channel" function. This station operation will scan through the available frequency ranges to detect Beacons of the proper ESSID. Once a proper frequency is detected, a station may freely associate with this base.

By design, a station will "associate" with a matching base if not already associated at power on. These "associations" are designed to be persistent from the station's point of view, that is, regardless of Power State, the relation will be preserved. Base's, however, cannot afford to preserve associations across power cycles and will require a re-association at each base power cycle. This operation is only 400–500 milliseconds in duration.

Stations that are associated with one base and relocate to associate with another base within the ESS, will have their original association deleted automatically. This feature of the RADPAD protocol conserves resources and ensures that the repeater/router functionality is reliable.

3.11 Association Management

Any successful communication within a BSS requires an "association" between the station and a base. This association relation provides proper address accessibility, repeater access, timing synchronization, and queued frame announcing. The Station/Base association is, thus a key architectural element in the RADPAD design paradigm. The following paragraphs will describe how this key function is managed within a BSS.

Association is initiated by a station once it receives a Beacon from the appropriate base, i.e., one that is assigned to the proper ESS Service Set. This negotiation "binds" the station to 1 the base and is persistent as long as the station does not explicitly "disassociate", re-associate with another base in the ESS, or the base is rebooted. In this manner, once a station has successfully "associated", this relation endures even across power cycles of the station itself. In the situation where a station is powered down and queued frames are dropped by the base, the association remains active. In an active state, should the station be unable to receive or detect any Beacons from its base, the station will report a communications error.

When a station leaves a BSS and re-associates with another base within the ESS, the new base will announce to it's peers this state change, and the original base (if in the same ESS) will automatically "disassociate" the station. In this manner, a station only has to associate with a base once and the management service functions are the responsibility of the base code.

4. RadPad API

The interface firmware for RADPAD is provided in one of two formats: (a) RS-232 Serial emulation mode (Modal); and (b) PPP frame mode (Modeless). These options are provided to the integrator to select the simplest option for integrating into the target system. For both interface options, the maximum data frame size is 253 bytes.

The serial emulation provides for the simplest, non-protocol dependent implementation option. Once configured, the RADPAD will behave exactly like a standard asynchronous serial I/O device (such as a modem). The simplicity of this approach is offset by the modality architecture imposed to affect configuration.

The PPP interface option supports a modeless interface, whereby commands and data frames may be freely interleaved. Additionally, this mode provides support for remote configuration, a feature not supported in the serial interface mode.

4.1 Serial Interface Support

If the RADPAD is in data mode, the unit powers up in a data ready mode. Any data transmitted or received in this mode will be treated as data to be transmitted/received between the addressed devices. Data frames will be constructed at transmitted based on either a time basis or on buffer fill conditions. It will be the responsibility of the receiving entity to re-assemble any logical "frame" structures to be processed by the receiving application.

Command mode is activated by transmitting a "break" character to the RADPAD. In this mode all data sent to the RADPAD will be interpreted as a command string and must conform to the syntax described in the following sections. Exiting back to data mode is achieved by issuing the "D/" character sequence.

4.2 PPP Interface Support

The RADPAD system accepts Command and Data frames on its serial port encapsulated in PPP format framing. RADPAD recognizes three RADPAD specified protocols running above PPP:

(a) RadPad Data Protocol (RDP). This protocol is used when application data frames are to be transmitted from the local RadPad to its communications partner. No actions will be invoked by the RadPad other than to reformat the frame and transmit it.

(b) RadPad Command Protocol (RCP). This protocol permits the local host system to issue configuration commands to the RadPad. Content in these frames is strictly for local operations and results in no data being transmitted.

(c) RadPad Remote Command Protocol (RRCP). This protocol affords the RadPad client the ability to configure any other RadPad with which it can communicate. This feature provides a straightforward mechanism for centralized configuration management within a BSS.

4.3 RDP Protocol

The RADPAD system sends any data received on the serial port in RDP frames over the radio to partner configured for the RADPAD. When data frames are received from the radio, the data is encapsulated in RDP frames and sent out through the, serial port.

All RDP and RRCP frames must be no more that 253 bytes in size. There is no fragmentation/defragmentation services provided with the RADPAD. Such functionality will be the responsibility of the RADPAD "host" application. Frames larger than the maximum size will be rejected.

When a RADPAD sends a frame of data on the radio link and receives an acknowledgment for that frame, it will send a plus sign ('+') embedded in an RCP frame out the serial port. If a frame of data is not acknowledged, after the requisite number of MAC retries, then the RADPAD will send an pound sign ('#') embedded in an RCP frame out of the serial port to indicate failure.

4.4 RCP and RRCP Protocols

This section describes the commands and responses used by the RADPAD system. All commands must be embedded in the RCP protocol (to be executed locally) or in the RRCP protocol (to be executed remotely). Responses are embedded in the same protocol format as the command was sent.

Each command is a single ASCII character, followed in some cases by further ASCII characters that act as parameters to the command, terminated by a forward slash. The RADPAD system responds to RADPAD commands with ASCII characters, as described in the subsections below. All commands and parameters are case-insensitive. No command may be more than 16 characters long, although multiple commands may be combined into a single RCP or RRCP frame. If the RADPAD finds 16 characters without a forward slash terminating the command, then it will discard all the characters, and send an ASCII 11 113.

Except as noted in the descriptions of the individual commands, the RADPAD system responds to each command with either an ASCII '0', to indicate that it received a valid command and has acted upon it, or an ASCII '1', to indicate that it did not perform the command, because the command was invalid, because it had invalid parameters, or because the command could not be executed given the current state of the RADPAD. These characters are always enveloped in the RCP or RRCP protocol. The possible error conditions are described with each command in the subsections below.

When a RADPAD sends an RRCP frame on the radio and receives an acknowledgment for that frame, it will send a plus sign ('+') embedded in an RRCP frame out of the serial port. If an RRCP frame is not acknowledged, even after the requisite number of MAC retries, then the pad will send an pound sign ('#') embedded in an RCP frame out of the serial port to indicate failure.

If a RADPAD loses its association it will send an asterisk ('*') embedded in an RCP frame out of the serial port. Associations are determined as "lost" upon failure to hear five (5) consecutive Beacons or determine that the BSSID has changed since association.

Three configurations are maintained by each RADPAD. The first configuration is stored in nonvolatile memory and is maintained even if power is lost. When the power is applied, the configuration is read from the non-volatile memory and copied into the scratch configuration and the current configuration. Except for the Partner Command and the Mode Command, which change both the scratch configuration and the current configuration, the scratch configuration is the one that is changed by the various configuration commands described in the following subsections. The current configuration is the one that the node is using for its operations. The scratch configuration is copied to the non volatile memory or to the current configuration by the "Use," Command.

5. Electrical Interface Specification 5.1 Pin Assignments

Pin 1: BCC—5 v supply voltage.
Pin 2: GND—0 volts return ground.
Pin 3: TX Data—TTL level input, a 1 is indicated by a high TTL level. The data rate is 55.55 Kbps +/−200 ppm.
Pin 4: GND—0 volts return ground.
Pin 5: RX Data—TTL level output, a 1 is indicated by high TTL level. The data rate is 55.55 Kbps +/−200 ppm.
Pin 6: Reset—TTL level input, a 0 held for greater than 10 msec. will reset the PAD CPU. Configuration is maintained but data is lost.
Pin 7: RTS—TTL level input, the active state is a high TTL level.
Pin 8: DTR—TTL level output.
Pin 9: CTS—TTL level output, the active state is a high TTL level.
Pin 10: Flash Program Enable—must be set low to program the Flash memory and set high or left to float for normal operation. This pin is pulled high on the board.

5.2 Power.

The radio requires a 5 volt +/−5% source. The RadPad in receive mode requires a maximum of 125 mA from BCC. When in transmit mode a maximum of 50 mA is required from BCC. In sleep mode a maximum of 2–3 mA is required from BCC. The BCC noise should be below 100 mV RMS.

When running with the RadPad protocol, power consumption is reduced dramatically. Power consumption with the RadPad protocol depends on sleep time and beacon intervals, which are configurable.

6. Mechanical Specification 6.1 Antenna Connector

Options exist for an onboard antenna, a coaxial connector or custom connection to a plated hole. The onboard antenna is located at one end of the radio PCB. The onboard antenna is useful if the antenna can be placed so it effectively radiates away from the device. The coaxial connector is used when a coaxial cable is necessary because of antenna mounting considerations. The end of the PCB has provision for a coaxial connector for antenna attachment. If the coaxial connector is not installed, the antenna can be attached to the PCB hole left vacant by the coaxial connector. This is useful when the antenna can be located close to the radio.

7. RF Signal Specification.

7.1 RF Signal Performance 7.1.1 General

Frequency: 2400 to 2500 MHz
Frequency Control: 1 MHz steps
Data Rate: 50 Kbps
Data Encoding: FM0
Operating Voltage: 5 v+/−5%
RadPad transmit current: 50 mA max.
RadPad receive current: 40 mA max.
RadPad sleep current: 3 mA max.

7.1.2 Transmit Performance

Transmit power level: −4 dBm +3, −5 dB
Center frequency tolerance: +/−50 kHz max.
Modulation: FSK
Out-of-band emissions: FCC regulations Part 15.247, 15.205, 15.209 in U.S.
ETSI 300–440 in Europe 7.1.3 Receive Performance Sensitivity: −90 dBm for $10^{-4}$ BER (min signal level)
Center frequency acceptance range: +/−50 kHz min
Maximum signal: −10 dBm min
Selectivity: 20 dB >+/−350 kHz min
(except around image) 30 dB >+/−500 kHz min 7.1.4 Timing Sleep to Idle: 10 msec max.
Transmit to Receive: 5 msec max.
Receive to Transmit: 5 msec max.

7.3 Range

In addition to the radio specifications range depends on the environment and the antenna. Typical range observed for the onboard antenna in an open environment is 50+ feet. Use of a high-gain antenna provides an extension of the range to 75–100 ft range.

While one detailed embodiment of the second-tier base station and the corresponding second-tier communication module is described above in detail, other relatively short range radios could also be used. For example, Bluetooth radios promise to provide short-range wireless peer-to-peer connectivity. Bluetooth is a standard under development among a group of computer and telecommunications industry leaders, including Intel, IBM, Toshiba, Ericsson and Nokia. A draft of the Specification of the Bluetooth System, v. 0.8 (Jan. 22, 1999) is herein incorporated by reference. Additional information on Bluetooth may be obtained at the website, www.bluetooth.com. If line of sight conditions exist (often the case), infrared communications can also facilitate this type of peer to peer network.

FIGS. 9–13 provide further details of the RADPAD system used in this invention.

Figure 14:
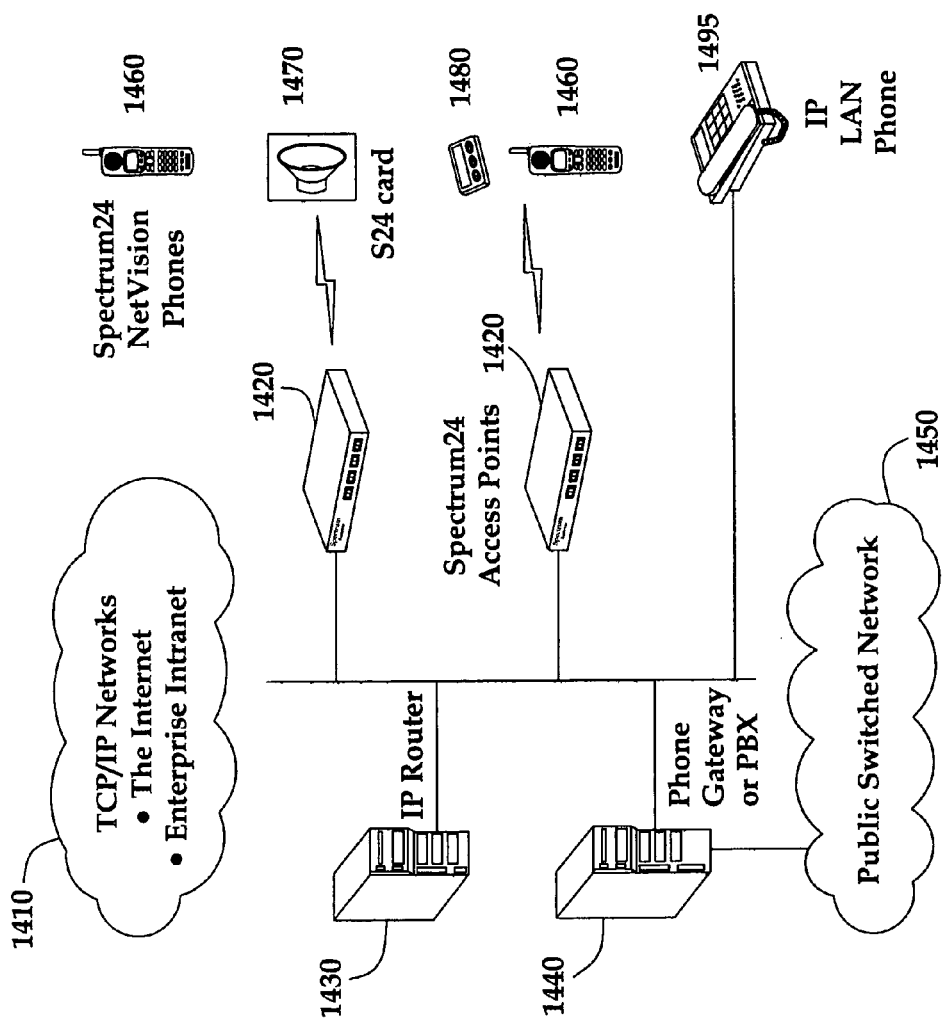
FIG. 14 is a block diagram of a multi-functional communications system.

FIG. 14 illustrates a further application of multiple wireless protocol communications. A gateway to the internet or enterprise intranet 1410 may be connected to an IP router 1420. In addition, a public switched network 1450 may be connected to a phone gateway or PBX 1440. Both the PBX 1440 and IP router 1420 are also connected to a plurality of access points 1420, which may use the Spectrum 24 protocol for wireless communications to devices such as phones 1460, pager 1480 or speaker 1470 that are equipped to communicate using that protocol. An IP LAN phone 1495 may also be connected to the PBX 1440 and IP router 1420. The IP LAN phone 1495 may be equipped to receive multiple IP addresses and indicate who the call is for based on that IP address. Such indication may be by way of a distinctive ringing tone, using the wireless network to notify the user's pager 1480, or switching the call directly to the user's phone 1490.

The IP LAN phone 1495 may also be equipped to read the RF ID tag of the person who is answering the call and thereby route the proper IP call to that person.

Figure 15:
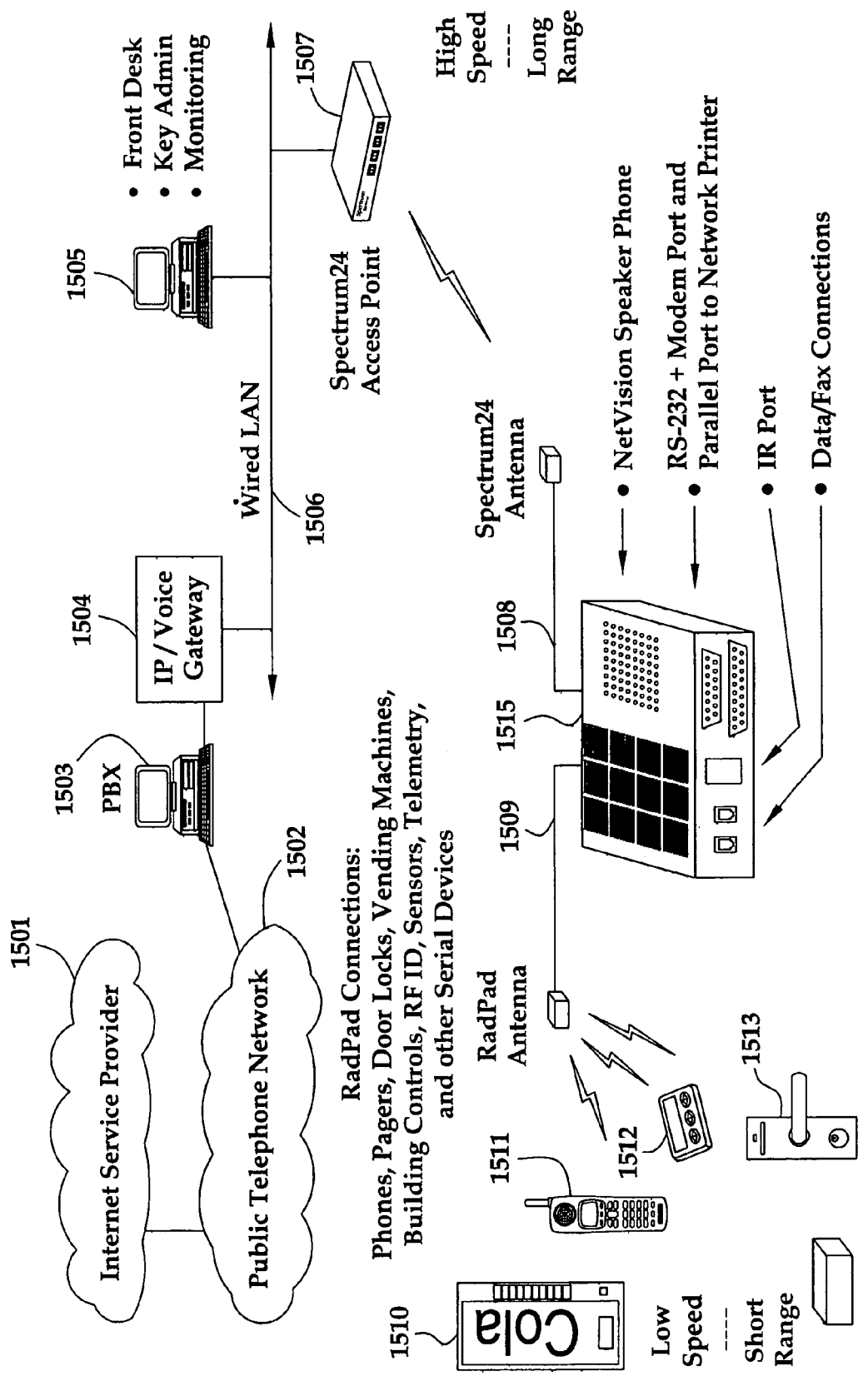
FIG. 15 illustrates a device capable of multiple communication protocols.

FIG. 15 illustrates a device and system capable of communication using the RadPad network and the IEEE 802.11 protocol at the same time. The system is connected to an internet service provider 1501 via a public telephone network 1502 and a PBX 1503 to an IP/Voice Gateway 1504 and a wired LAN 1506. The wired LAN 1506 may be connected to one or more terminals 1505. The wired LAN is also connected to an IEEE 802.11 access point 1507, which may utilize the Spectrum 24 network. A multiple use device 1515 containing a RadPad antenna 1590 and a IEEE 802.11 antenna 1508 as well as ports for data/fax communication, infrared tO communication, communication using the RS-232 protocol, modem communication and printer communication is provided in the system. The multiple-use device 1515 uses the RadPad antenna 1509 to communicate with various devices such as vending machine 1510, phone 1511, pager 1512, door lock 1513, each of which has a RadPad device installed therein. These communications are suitable for low speed, short range needs. The multiple use device 1515 also uses the IEEE 802.11 antenna 1508 to communicate in a high speed, long range manner with the access point 1507 to access services on the wired LAN 1506, which may include the use of the Internet for data and voice-over IP.

Figure 16:
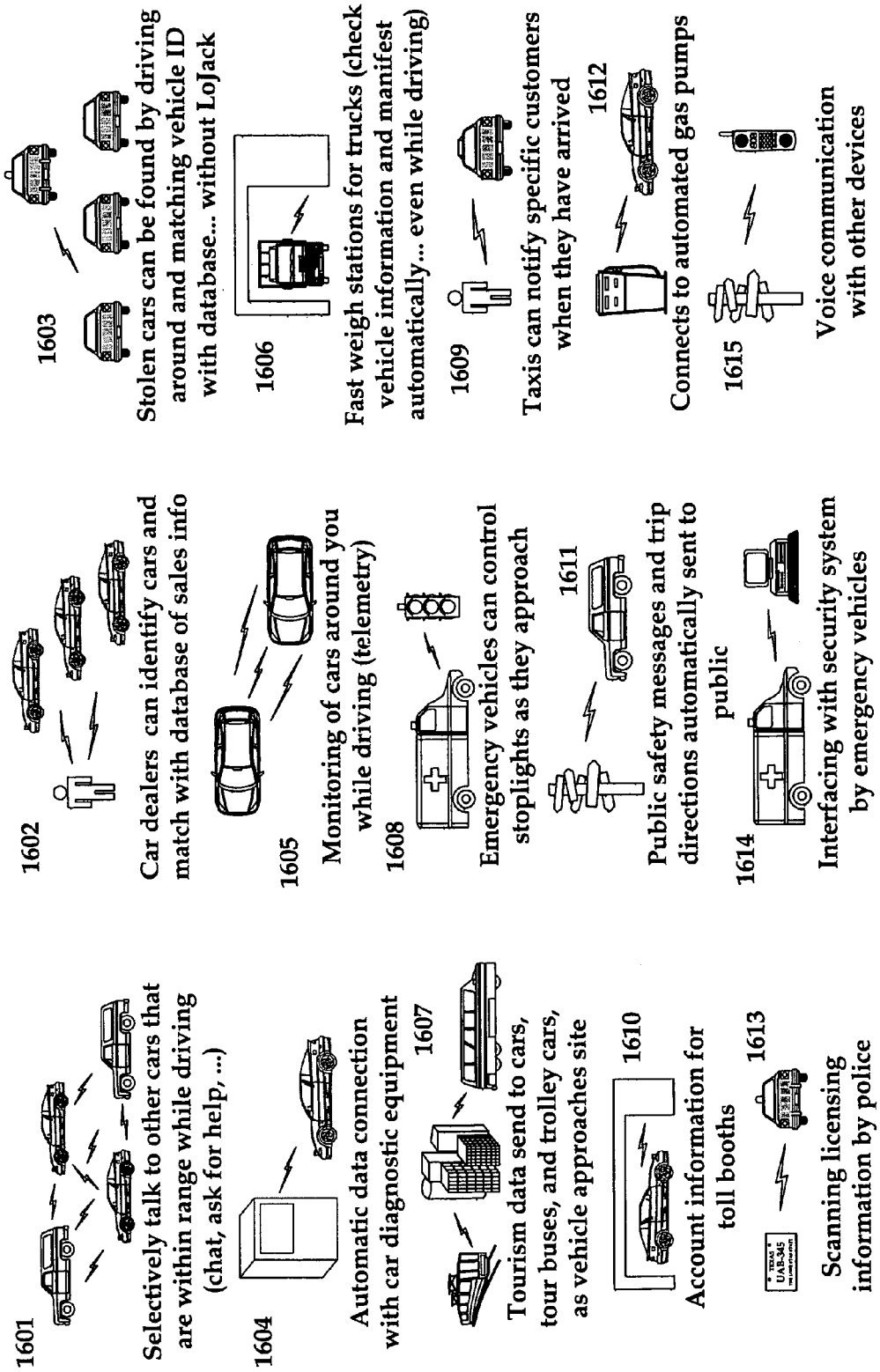
FIG. 16 illustrate multiple applications of wireless communications.

FIG. 16 illustrates a number of practical applications of the RadPad system primarily in the area of mobile communications. The low-power, low-speed, short range nature of the system installed in each vehicle allows the following communications to take place among vehicles:

Communication with other vehicles 1601;

Identification of cars in sales lot that match the car with its sales information 1602;

Identification of stolen cars 1603;

Collection of diagnostic information 1604;

Monitoring of surrounding cars while move to prevent accidents 1605;

Rapid collection of information for weigh station purposes 1606;

Data about a fixed site sent to passing vehicles 1607;

Controlling stoplight for emergency vehicles 1608;

Informing a prospective customer that a taxicab is available 1609;

Account information for toll booths 1610

Broadcasting public safety messages 1611

Billing information for gas station pumps 1612

Scanning licensing information by police 1613

Interfacing with security systems by emergency vehicles 1614

Voice communication with other devices 1615.

Figure 17:
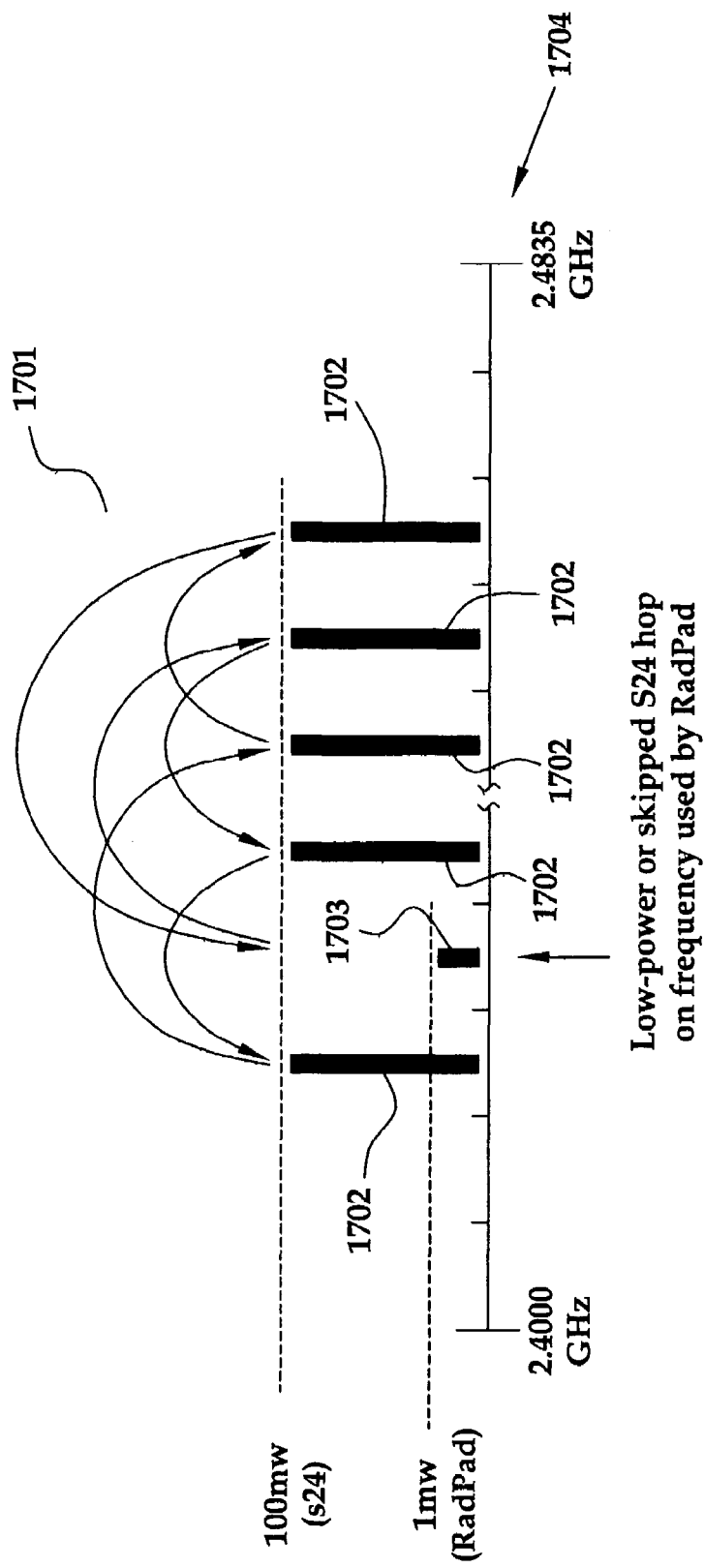
FIG. 17 illustrates a methodology for using multiple communications protocols simultaneously.

FIG. 17 illustrates a methodology for coordinating transmissions along the same ISM 2.4 GHz frequency band between, for example, a high power IEEE 802.11 frequency hoping protocol and a low power RadPad protocol. In the ISM 2.4 GHz band 1704, there are a number of channels 1701 available for frequency hopping. Under IEEE 802.11, a transmission 1702 may be up to 100 mW, while a RadPad transmission 1703 is only 1 mW. In order to coordinate the two protocols, the access point for the IEEE 802.11 protocol coordinates via the RadPad's serial interface to determine which channel in the ISM band the RadPad will use for its transmissions. After doing so, the access point for the IEEE 802.11 protocol reduces the power level usage for the channel reserved for RadPad (and possibly the surrounding channels as well) to zero. This greatly reduces the chance of IEEE 802.11 interference (at 100 mW) with the RadPad (at 1 mW).

Figure 18:
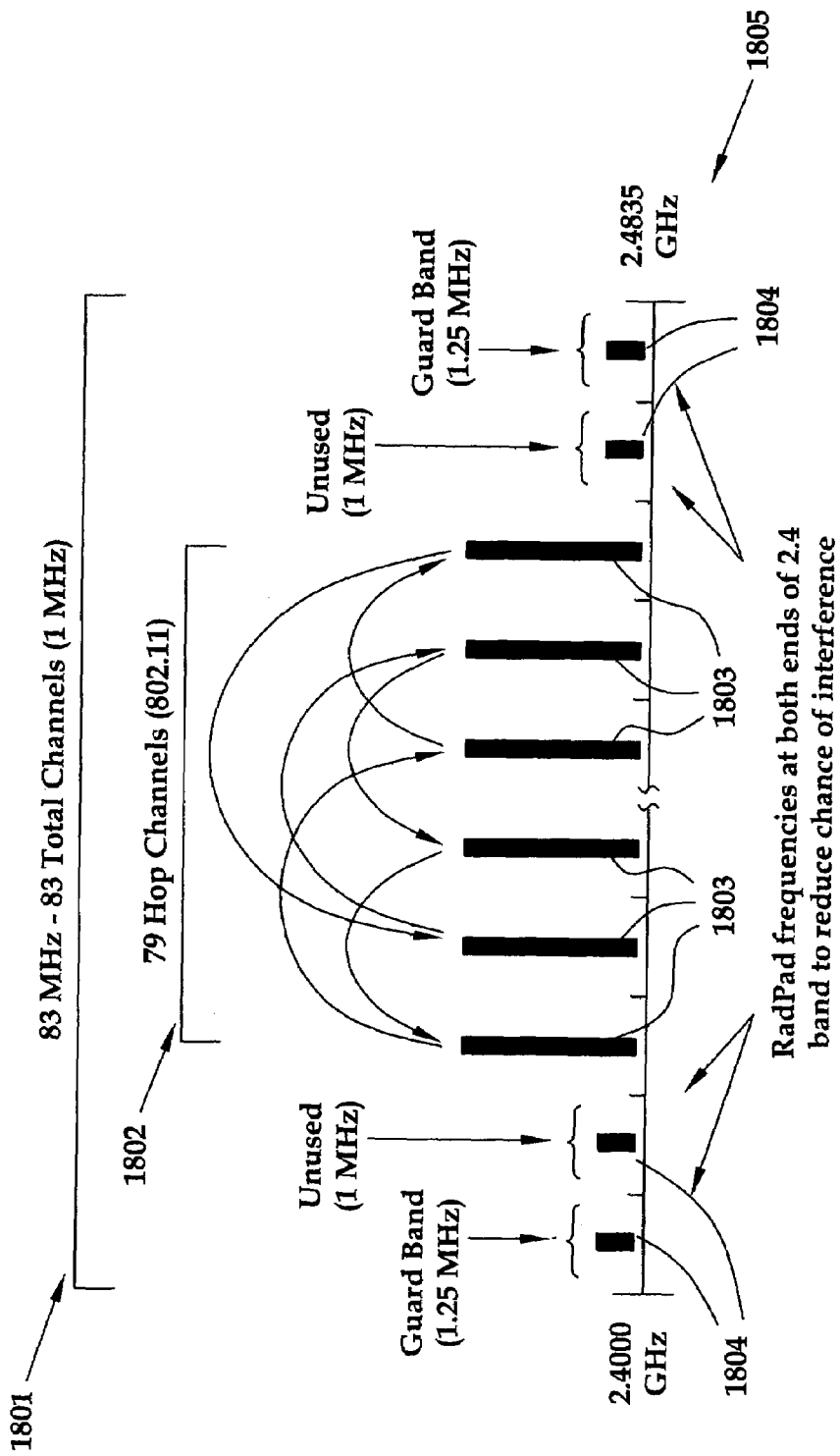
FIG. 18 illustrates another methodology for using multiple communications protocols simultaneously.

FIG. 18 illustrates another methodology for coordinating transmissions along the same ISM 2.4 GHz frequency band between, for example, a high power IEEE 802.11 frequency hoping protocol and a low power RadPad protocol. The ISM 2.4 GHz band 1805 is divided into 83 total channels 1801 of 1 MHz each for frequency hopping purposes (except for the first and last channels, which are 1.25 MHz). Of those 83 channels, the center 79 channels 1802 are actually used for the IEEE 802.11 protocol. Each of these 79 channels can operate at up to 100 mW 1803. By operating in a low-power mode in the first two and last two bands 1804, the RadPad can operate in the same ISM band as IEEE 802.11 without interference. In particular, because the RadPad operates a low power of 1 mW, there will be little spillover into the other bands used by IEEE 802.11 and, even if there is some interference, such interference will only occur once every 79 hops in a single cell.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A multi-tier system for digital radio communication, comprising:
    a first-tier base station comprising a first radio transceiver operating in accordance with a first communication protocol;
    a wireless device comprising a second radio transceiver operating in accordance with a second communication protocol that is different from the first communication protocol;
    a combination unit that is wirelessly connected to the first-tier base station and connected to the wireless device;
    wherein the first communications protocol is employed for transmissions at a higher speed and has a longer range than the second communications protocol and wherein the first-tier base station communicates with the wireless device via the combination unit,
    and wherein the first-tier base station communicates to the combination unit one or more discrete number of frequency channels that may be utilized by the combination unit to communicate with the wireless device.

2. The system as in claim 1, wherein the combination unit includes at least one of ports for communicating via infrared wireless transmission, facsimile transmission, and transmission using a modem.

3. The system as in claim 1, wherein the first-tier base station communicates to the combination unit a plurality of the one or more discrete number of frequency channels that may be employed by the combination unit.

4. The system as in claim 1, wherein the first communications protocol and the second communications protocol each utilizes frequency hopping to transmit data.

5. A method for coordinating communication, comprising:
    transmitting via a first communications protocol using a wireless medium, wherein the first communications protocol utilizes frequency hopping to transmit a message over a discrete number of frequency channels within a frequency band;
    transmitting via a second communications protocol to communicate using a wireless medium, wherein the second communications protocol utilizes frequency hopping to transmit a message over a discrete number of frequency channels within the frequency band, wherein the second communications protocol operates at a lower power level than the first communications protocol;
    coordinating between a device using the second communication protocol and a transmitting device transmitting via the first communication protocol to determine one or more discrete number of frequency channels that will not be used by the first communications protocol and transmitting via the second communications protocol using the one or more discrete number of frequency channels that are not used by the first communications protocol.

6. The method as in claim 5, wherein the frequency band is the 2.4 GHz ISM band.

7. The method as in claim 5, wherein the act of coordinating comprises determining a plurality of discrete number of frequency channels that will not be used by the first communications protocol and transmitting via the second communications protocol using the plurality of discrete number of frequency channels that are not used by the first communications protocol.

8. The method as in claim 5, wherein the second communications protocol operates at a power level of about 1 mW and wherein the first communications protocol operates at a power level of about 100 mW.

9. The method as in claim 5, wherein the coordinating is between an access point transmitting via the first communication protocol and a combination unit transmitting via the second communication protocol to a wireless device.

10. The method as in claim 5, wherein the one or more discrete number of frequency channels that are not being used by the first communications protocol are frequency channels on either end of the frequency band.

11. The method as in claim 5, wherein at least two of the one or more discrete number of frequency channels are not being used, and wherein the at least two frequency channels that are not being used by the first communications protocol are the two frequency channels on either end of the frequency band.

12. The method as in claim 5, wherein the first communication protocol is the IEEE 802.11 protocol.

13. A system for wireless communication, comprising:
   a first-tier base station comprising a first radio transceiver operating in accordance with a first communication protocol;
   a second-tier base station comprising a second radio transceiver operating in accordance with a second communication protocol independent of the first communication protocol;
   a first-tier remote unit wirelessly connected to the first-tier base station through the first radio transceiver;
   a second-tier remote unit wirelessly connected to the second-tier base station through the second radio transceiver;
   wherein the first-tier remote unit connects to the first-tier base station via a first communications protocol using a wireless medium, wherein the first communications protocol utilizes frequency hopping to transmit a message over a discrete number of frequency channels within a frequency band;
   wherein the second-tier remote unit connects to the second-tier base station via a second communications protocol using a wireless medium, wherein the second communications protocol utilizes frequency hopping to transmit a message over a discrete number of frequency channels within a frequency band, wherein the second communications protocol operates at a lower power level than the first communications protocol,
   and wherein the first-tier base station and the second-tier base station coordinate to determine the one or more discrete number of frequency channels that will not be used by the first communications protocol and direct the second-tier base station to use only the one or more discrete number of frequency channels that are not used by the first-tier base station.

14. The system as in claim 13, wherein the frequency band is the 2.4 GHz ISM band and wherein the first communications protocol is the IEEE 802.11 protocol.

15. The system as in claim 13, wherein the first communications protocol operates at a power level of about 100 mW.

16. The system as in claim 13, wherein the second communications protocol operates at a power level of about 1 mW.

17. The system as in claim 13, wherein the one or more discrete number of frequency channels that are not being used by the first communications protocol are frequency channels on either end of the frequency band.

18. The system as in claim 13, wherein at least two of the one or more discrete number of frequency channels that are not being used, and wherein the at least two frequency channels that are not being used by the first communications protocol are the two frequency channels on either end of the frequency band.

19. The system as in claim 13, wherein the second communications protocol is used to communicate among at least two moving vehicles.

20. The system as in claim 13, wherein the second communications protocol is used to identify a vehicle using a database of vehicle information.

21. The system as in claim 13, wherein the second communications protocol is used to identify the identity and location of a missing vehicle.

22. The system as in claim 13, wherein the second communications protocol is used to obtain diagnostic information for a vehicle.

23. The system as in claim 13, wherein the second communications protocol is used among at least two vehicles to prevent collisions between the at least two vehicles.

24. The system as in claim 13, wherein the second communications protocol is used to transmit information associated with a weight of a vehicle.

25. The system as in claim 13, wherein the second communications protocol is used to transmit data about a fixed location to a vehicle.

26. The system as in claim 13, wherein the second communications protocol is used by a vehicle to control traffic control signals.

27. The system as in claim 13, wherein the second communications protocol is used to inform a prospective customer that a taxicab is available.

28. The system as in claim 13, wherein the second communications protocol is used to determine information associated with a toll.

29. A method for coordinating communication, comprising:
   transmitting via a first communications protocol using a wireless medium, wherein the first communications protocol utilizes frequency hopping to transmit a message over a discrete number of frequency channels within a frequency band;
   transmitting via a second communications protocol to communicate using a wireless medium, wherein the second communications protocol utilizes frequency hopping to transmit a message over a discrete number of frequency channels within the frequency band, wherein the second communications protocol operates at a lower power level than the first communications protocol;
   coordinating between a device using a second communications protocol and a transmitting device transmitting via the first communication protocol to determine a plurality of discrete number of frequency channels that will be used by the first communications protocol and transmitting via the second communications protocol using one or more discrete number of frequency channels other than those used by the first communications protocol.

30. The method as in claim 29, wherein coordinating with the transmitting device comprises indicating from the transmitting device to the device using the second communications protocol the one or more discrete number of frequency channels that may be employed.

* * * * *